United States Patent
Sekigawa

(10) Patent No.: US 10,512,930 B2
(45) Date of Patent: Dec. 24, 2019

(54) OPERATION METHOD FOR COATING EXHAUST TREATMENT SYSTEM

(71) Applicant: Taikisha Ltd., Tokyo (JP)

(72) Inventor: Takuya Sekigawa, Tokyo (JP)

(73) Assignee: Taikisha Ltd., Tokyo (JP)

( * ) Notice: Subject to any disclaimer, the term of this patent is extended or adjusted under 35 U.S.C. 154(b) by 140 days.

(21) Appl. No.: 15/556,882

(22) PCT Filed: Feb. 1, 2016

(86) PCT No.: PCT/JP2016/052884
§ 371 (c)(1),
(2) Date: Sep. 8, 2017

(87) PCT Pub. No.: WO2016/143409
PCT Pub. Date: Sep. 15, 2016

(65) Prior Publication Data
US 2018/0221905 A1 Aug. 9, 2018

(30) Foreign Application Priority Data
Mar. 11, 2015 (JP) .................................. 2015-048313

(51) Int. Cl.
*B05B 14/48* (2018.01)
*B05B 14/435* (2018.01)
(Continued)

(52) U.S. Cl.
CPC ........ *B05B 14/437* (2018.02); *B01D 46/0057* (2013.01); *B01D 46/0083* (2013.01);
(Continued)

(58) Field of Classification Search
CPC ............ B01D 46/0083; B01D 46/0057; B01D 2273/12; B05B 14/437; B05B 14/48;
(Continued)

(56) References Cited

U.S. PATENT DOCUMENTS 5,454,872 A * 10/1995 Lader .................... B05B 7/1454
118/602
8,801,820 B2    8/2014 Iwakiri
(Continued)

FOREIGN PATENT DOCUMENTS

CN       102271784 A    12/2011
DE    102007040153 A1    2/2009
(Continued)

*Primary Examiner* — Minh Chau T Pham
(74) *Attorney, Agent, or Firm* — The Webb Law Firm

(57) ABSTRACT

Provided is an operation method for a coating exhaust treatment system that includes a filter configured to filter discharged air discharged from a coating chamber in which a coating object is spray-coated and collect overspray coating material included in the discharged air, and a powder dispersal means configured to disperse powder for forming a filter covering layer in the discharged air and form a filter covering layer made of a layer of the accumulated powder on a surface on the filter as the discharged air passes through the filter, the method including, when the number of repetitions of a first operation reaches a set number while the first operation and a second operation are being repeatedly carried out alternatingly, discarding coating material-containing powder and supplying fresh powder to a first supply tank, and when the number of repetitions of the second operation reaches the set number, discarding the coating material-containing powder and supplying the fresh powder to the second supply tank.

10 Claims, 17 Drawing Sheets

(51) Int. Cl.
*B05B 16/00* (2018.01)
*B05B 12/16* (2018.01)
*B05B 14/10* (2018.01)
*B09B 5/00* (2006.01)
*B09B 3/00* (2006.01)
*B05B 14/43* (2018.01)
*B01D 46/00* (2006.01)

(52) U.S. Cl.
CPC ............ *B05B 12/16* (2018.02); *B05B 14/435* (2018.02); *B05B 14/48* (2018.02); *B05B 16/00* (2018.02); *B09B 3/00* (2013.01); *B09B 5/00* (2013.01); *B01D 2273/12* (2013.01); *B05B 14/10* (2018.02); *B05B 16/90* (2018.02)

(58) Field of Classification Search
CPC ....... B05B 14/435; B05B 16/00; B05B 12/16; B05B 16/90; B05B 14/10; B09B 5/00; B09B 3/00
USPC ............ 55/DIG. 46; 118/602, 603, 308, 310, 118/311, 312, 313, 326; 454/50, 53, 55
See application file for complete search history.

(56) References Cited

U.S. PATENT DOCUMENTS

| | | |
|---|---|---|
| 2011/0262324 A1 | 10/2011 | Fritz et al. |
| 2014/0056776 A1 | 2/2014 | Fritz et al. |
| 2014/0130674 A1 | 5/2014 | Holler et al. |
| 2015/0375251 A1 | 12/2015 | Roeckle |

FOREIGN PATENT DOCUMENTS

| | | |
|---|---|---|
| EP | 2452757 A1 | 5/2012 |
| JP | 647245 A | 2/1994 |
| JP | 2013166118 A | 8/2013 |
| JP | 2013544640 A | 12/2013 |
| WO | 2014121882 A1 | 8/2014 |

\* cited by examiner

Fig.6

| | | FRESH POWDER TANK 27 | COATING BOOTH | FIRST SUPPLY TANK 25A | SECOND SUPPLY TANK 25B | RELAY TANK 23 | RECYCLING TREATMENT | DISCARDING TANK 28 |
|---|---|---|---|---|---|---|---|---|
| START TIME | | FRESH POWDER | | FRESH POWDER | EMPTY | EMPTY | | |
| 1ST DAY | DURING OPERATION | | | | | | NO OPERATION | |
| | STOP TIME | | | EMPTY | FRESH POWDER | USED ONCE | | |
| 2ND DAY | DURING OPERATION | | | | | | | |
| | STOP TIME | | | RECYCLED ONCE | EMPTY | USED ONCE | | |
| 3RD DAY | DURING OPERATION | | | | | | | |
| | STOP TIME | | | EMPTY | RECYCLED ONCE | USED TWICE | | |
| 4TH DAY | DURING OPERATION | | | | | | | |
| | STOP TIME | | | RECYCLED TWICE | EMPTY | USED TWICE | | |
| 5TH DAY | DURING OPERATION | | | | | | | |
| | STOP TIME | | | EMPTY | RECYCLED TWICE | USED THREE TIMES | | |
| 6TH DAY | DURING OPERATION | | | | | | | |
| | STOP TIME | | | RECYCLED THREE TIMES | EMPTY | USED THREE TIMES | | |
| 7TH DAY | DURING OPERATION | | | | | | | |
| | STOP TIME | | | EMPTY | RECYCLED THREE TIMES | USED FOUR TIMES | | |
| 8TH DAY | DURING OPERATION | | | | | | | |
| | STOP TIME | | | RECYCLED FOUR TIMES | EMPTY | USED FOUR TIMES | | |
| 9TH DAY | DURING OPERATION | | | | | | | |
| | STOP TIME | | | EMPTY | RECYCLED FOUR TIMES | USED FIVE TIMES | | |
| 10TH DAY | DURING OPERATION | | | | | | | |
| | STOP TIME | | | RECYCLED FIVE TIMES | EMPTY | USED FIVE TIMES | | |
| 11TH DAY | DURING OPERATION | | | | | | | |
| | STOP TIME | FRESH POWDER | | EMPTY | RECYCLED FIVE TIMES | USED SIX TIMES | NO OPERATION | DISCARDING |
| 12TH DAY | DURING OPERATION | | | | | | | |
| | STOP TIME | FRESH POWDER | | FRESH POWDER | EMPTY | USED SIX TIMES | NO OPERATION | DISCARDING |
| 13TH DAY (=1ST DAY) | DURING OPERATION | | | | | | | |
| | STOP TIME | | | EMPTY | FRESH POWDER | USED ONCE | | |

Fig.7

| | | COATING BOOTH | FIRST SUPPLY TANK 25A | SECOND SUPPLY TANK 25B | RELAY TANK 23 | RECYCLING TREATMENT | DISCARDING TANK 28 | FRESH POWDER TANK 27 |
|---|---|---|---|---|---|---|---|---|
| START TIME | | | FRESH POWDER | EMPTY | USED THREE TIMES | | | |
| 1ST DAY | DURING OPERATION | | | | | | | |
| | STOP TIME | | EMPTY | RECYCLED THREE TIMES | USED ONCE | | | |
| 2ND DAY | DURING OPERATION | | | | | | | |
| | STOP TIME | | RECYCLED ONCE | EMPTY | USED FOUR TIMES | | | |
| 3RD DAY | DURING OPERATION | | | | | | | |
| | STOP TIME | | EMPTY | RECYCLED FOUR TIMES | USED TWICE | | | |
| 4TH DAY | DURING OPERATION | | | | | | | |
| | STOP TIME | | RECYCLED TWICE | EMPTY | USED FIVE TIMES | | | |
| 5TH DAY | DURING OPERATION | | | | | | | |
| | STOP TIME | | EMPTY | RECYCLED FIVE TIMES | USED THREE TIMES | | | |
| 6TH DAY | DURING OPERATION | | | | | | | |
| | STOP TIME | | RECYCLED THREE TIMES | EMPTY | USED SIX TIMES | NO OPERATION | DISCARDING | |
| 7TH DAY | DURING OPERATION | | | | | | | |
| | STOP TIME | | EMPTY | FRESH POWDER | USED FOUR TIMES | | | FRESH POWDER |
| 8TH DAY | DURING OPERATION | | | | | | | |
| | STOP TIME | | RECYCLED FOUR TIMES | EMPTY | USED ONCE | | | |
| 9TH DAY | DURING OPERATION | | | | | | | |
| | STOP TIME | | EMPTY | RECYCLED ONCE | USED FIVE TIMES | | | |
| 10TH DAY | DURING OPERATION | | | | | | | |
| | STOP TIME | | RECYCLED FIVE TIMES | EMPTY | USED TWICE | | | |
| 11TH DAY | DURING OPERATION | | | | | | | |
| | STOP TIME | | EMPTY | RECYCLED TWICE | USED SIX TIMES | | | |
| 12TH DAY | DURING OPERATION | | | | | | | |
| | STOP TIME | | FRESH POWDER | EMPTY | USED THREE TIMES | NO OPERATION | DISCARDING | FRESH POWDER |
| 13TH DAY (=1ST DAY) | DURING OPERATION | | | | | | | |
| | STOP TIME | | EMPTY | RECYCLED THREE TIMES | USED ONCE | | | |

OPERATION METHOD FOR COATING EXHAUST TREATMENT SYSTEM

CROSS-REFERENCE TO RELATED APPLICATIONS

This application is the United States national phase of International Application No. PCT/JP2016/052884 filed Feb. 1, 2016, and claims priority to Japanese Patent Application No. 2015-048313 filed Mar. 11, 2015, the disclosures of which are hereby incorporated in their entirety by reference.

TECHNICAL FIELD

The present invention relates to an operation method for a coating exhaust treatment system including: a filter that filters discharged air discharged from a coating chamber in which a coating object is spray-coated, and collects overspray coating material included in the discharged air; and a powder dispersal means for dispersing powder for forming a filter covering layer in the discharged air so as to form a filter covering layer made of a layer of accumulated powder on the surface of the filter as the discharged air passes through the filter.

BACKGROUND ART

In order to collect the overspray coating material included in discharged air discharged from a coating chamber using a filter, this type of coating exhaust treatment system is configured to form a filter covering layer made of a layer of accumulated powder and thereby trap the overspray coating material in the discharged air using the filter covering layer. Accordingly, it is possible to prevent the overspray coating material from directly sticking to the filter, and the filter can be used repeatedly by merely removing the filter covering layer in which the overspray coating material is trapped (or in other words, the coating material-containing powder obtained by trapping the overspray coating material, as the filter covering layer) from the filter through a suitable filter cleaning treatment.

Incidentally, it has been proposed hereinbefore in Patent Document 1 that after being removed from the filter through the filter cleaning treatment, the coating material-containing powder is subjected to a recycling treatment through a heat treatment and a pulverization treatment, and the powder recycled in the recycling treatment is dispersed in the discharged air from the coating chamber once again as powder for forming a filter covering layer, using a powder dispersal means (in particular, see Claims 1 and 2 in Patent Document 1).

It has also been proposed in Patent Document 1 that after being removed from the filter through the filter cleaning treatment, the percentage of coating material in the coating material-containing powder is measured using a measurement apparatus, and based on the measurement result, the amount of the coating material-containing powder and the amount of fresh powder supplied from a storage apparatus, which are mixed in the powder to be dispersed once again by the powder dispersal means, are adjusted (in particular, see paragraphs [0197] to [0199] and FIG. 4 in Patent Document 1).

PRIOR ART DOCUMENTS

Patent Documents

Patent Document 1: JP 2013-544640A

DISCLOSURE OF THE INVENTION

Problem to be Solved by the Invention

However, with the coating exhaust treatment system disclosed in Patent Document 1, it is difficult for a manager to check whether or not the running state of the system is suitable, and in this regard, it is difficult to manage the system, which is a problem.

In view of this circumstance, the present invention mainly aims to make it easier to manage the system by finding a logical operation method therefor.

Means for Solving Problems

A characteristic of an "operation method for a coating exhaust treatment system" provided by a first aspect of the present invention lies in that an operation method for a coating exhaust treatment system including a filter configured to filter discharged air discharged from a coating chamber in which a coating object is spray-coated and collect overspray coating material included in the discharged air, and a powder dispersal means configured to disperse powder for forming a filter covering layer in the discharged air and form a filter covering layer made of a layer of the accumulated powder on a surface on the filter as the discharged air passes through the filter includes:

in a first operation, carrying out a first exhaust treatment step of dispersing the powder stored in a first supply tank in the discharged air using the powder dispersal means and causing the discharged air to pass through the filter, and carrying out a first recycling step of recycling the coating material-containing powder in a relay tank using a recycling treatment portion and storing the recycled powder in a second supply tank and a first storing step of storing the coating material-containing powder that was removed from the filter through filter cleaning treatment in the first exhaust treatment step in the relay tank after sending the coating material-containing powder in the relay tank to the recycling treatment portion in the first recycling step; and in a second operation, carrying out a second exhaust treatment step of dispersing the powder stored in the second supply tank in the discharged air using the powder dispersal means and causing the discharged air to pass through the filter, and carrying out a second recycling step of recycling the coating material-containing powder in the relay tank using the recycling treatment portion and storing the recycled powder in the first supply tank and a second storing step of storing the coating material-containing powder that was removed from the filter through filter cleaning treatment in the second exhaust treatment step in the relay tank after sending the coating material-containing powder in the relay tank to the recycling treatment portion in the second recycling step; and the method further includes:

when the number of repetitions of the first operation reaches a set number while the first operation and the second operation are repeatedly being carried out alternatingly, carrying out a first operation refreshing treatment of discarding the coating material-containing powder stored in the relay tank in the first storing step as powder at its usage limit, supplying fresh said powder to the first supply tank after the powder is supplied to the powder dispersal means in the first exhaust treatment step, and resetting the number of repetitions of the first operation; and similarly, when the number of repetitions of the second operation reaches the set number, carrying out a second operation refreshing treatment of discarding the coating material-containing powder stored in the relay tank in the second storing step as powder at its usage limit, supplying fresh said powder to the second supply tank after the powder is supplied to the powder dispersal means in the second exhaust treatment step, and resetting the number of repetitions of the second operation.

According to this operation method, in the first exhaust treatment step of the first operation, powder stored in the first supply tank is dispersed in the discharged air from the coating chamber using the powder dispersal means, and therefore the amount of powder stored in the first supply tank decreases monotonically.

Also, in the first recycling step of the first operation, the coating material-containing powder in the relay tank is sent to the recycling treatment portion and subjected to the recycling treatment and the powder resulting from the recycling treatment (i.e., the recycled powder) is stored in the second supply tank, and therefore the amount of powder stored in the relay tank decreases monotonically, and conversely, the amount of powder stored in the second supply tank increases monotonically.

Furthermore, in the first storage step of the first operation, after being removed from the filter through the filter cleaning treatment in the first exhaust treatment step, the coating material-containing powder is stored in the relay tank, and therefore the amount of powder stored in the relay tank increases monotonically.

On the other hand, in the second exhaust treatment step of the second operation, the powder stored in the second supply tank is dispersed in the discharged air from the coating chamber using the powder dispersal means, and therefore the amount of powder stored in the second supply tank decreases monotonically.

Also, in the second recycling step of the second operation, the coating material-containing powder in the relay tank is sent to the recycling treatment portion and subjected to the recycling treatment and the powder resulting from the recycling treatment (the recycled powder) is stored in the first supply tank, and therefore the amount of powder stored in the relay tank decreases monotonically, and conversely, the amount of powder stored in the first supply tank increases monotonically.

Furthermore, in the second storage step of the second operation, after being removed from the filter through the filter cleaning treatment in the second exhaust treatment step, the coating material-containing powder is stored in the relay tank, and therefore the amount of powder stored in the relay tank increases monotonically.

In other words, the manager can easily check that the steps of the operations are progressing smoothly by monitoring the monotonic decrease and monotonic increase of the amounts of powder stored in the first supply tank, the second supply tank, and the relay tank.

Accordingly, at any rate, in this regard, it is possible to make it easier to manage the system.

On the other hand, upon repeating the first operation and the second operation, even if the recycling treatment is performed each time, the proportion of combustible material in the powder resulting from the recycling treatment gradually increases, and the properties of the filter covering layer formed through the accumulation of powder resulting from the recycling treatment gradually deteriorate, and therefore there is a limit to the repetition of the first operation and the second operation.

In contrast to this, with this operation method, the increase of the proportion of combustible material in the powder resulting from the recycling treatment and the deterioration of the properties of the filter covering layer can be held in a constant allowable range, by setting a suitable number based on experimental results, trial operation results and the like, as the above-mentioned set number.

In other words, with this operation method, the safety and performance of the system can also be kept favorable.

Also, the first operation refreshing treatment and second operation refreshing treatment for resetting the number of repetitions of the first operation and the second operation after the coating material-containing powder, which is stored in the relay tank, is discarded as powder that has reached its usage limit and fresh powder is supplied to the first supply tank and the second supply tank after the powder is supplied to the powder dispersal means may merely be performed each time the number of repetitions of the first operation and the second operation reaches the set number, and therefore, in this regard as well, it is possible to simplify the management of the system compared to the case where a portion of the powder in the first supply tank and the second supply tank is discarded each time the first operation and the second operation are performed and fresh powder of an amount equal to the amount discarded is supplied to the first supply tank and the second supply tank, or the like.

Note that if the amount of powder needed for one instance of the first operation or one instance of the second operation is stored in the first supply tank or the second supply tank, it is possible to more accurately and easily determine whether or not the system running state is favorable based on the monotonic decrease or monotonic increase of the powder storage amount, as described above.

With the "operation method for a coating exhaust treatment system" provided by the first aspect of the present invention, as a second characteristic, the number of repetitions of the second operation may be set to reach the set number in the second operation carried out after the first operation in which the number of repetitions has reached the set number, or, the number of repetitions of the first operation may be set to reach the set number in the first operation carried out after the second operation in which the number of repetitions has reached the set number.

With this operation method, by repeatedly carrying out the first operation and the second operation alternatingly, the first operation refreshing treatment and the second operation refreshing treatment can always be performed in the same period, and in this regard, the management of the system can be performed more easily.

With the "operation method for a coating exhaust treatment system" provided by the first aspect of the present invention, as a third characteristic the number of repetitions of the second operation may be set to reach the set number in the second operation carried out after the first operation in which the number of repetitions has reached approximately half of the set number, or, the number of repetitions of the first operation may be set to reach the set number in the first operation carried out after the second operation in which the number of repetitions has reached approximately half of the set number.

With this operation method, when repeatedly carrying out the first operation and the second operation alternatingly, even in the state in which the number of repetitions of the first operation approaches the set number and the number of past instances of the recycling treatment of the powder used in the first operation approaches the allowed limit number, the number of repetitions of the second operation only reaches about half of the set number, and the number of past instances of the recycling treatment of the powder used in the second operation only reaches about half of the allowed limit number.

Similarly, even in the state in which the number of repetitions of the second operation reaches the set number and the number of past instances of the recycling treatment of the powder used in the second operation approaches the allowable limit number, the number of repetitions of the first operation reaches only about half of the set number, and the number of past instances of the recycling treatment of the powder used in the first operation reaches only about half of the allowable limit number.

Accordingly, the variation range of the average number of instances of the recycling treatment of the powder dispersed in the discharged air from the coating chamber by the powder dispersal means can be reduced, the average increase range of the proportion of combustible materials in the powder to be used can be reduced, the average range of deterioration of the properties of the filter covering layer can be reduced, and the like, and accordingly, the stability of the system performance can be further increased.

Note that in order to reach the state in which the number of repetitions of the second operation reaches the set number in the second operation, which is carried out after the first operation that has been repeated a number of times that is approximately half of the set number, or the state in which the number of repetitions of the first operation reaches the set number in the first operation, which is carried out after the second operation that has been repeated a number of times that is approximately half of the set number, the timing of carrying out the first operation refreshing treatment and the timing of carrying out the second operation refreshing treatment need only be adjusted intentionally in the initial period of alternating operations in which the first operation and the second operation are repeatedly carried out alternatingly.

A characteristic of an "operation method for a coating exhaust treatment system" provided by a second aspect of the present invention lies in that an operation method for a coating exhaust treatment system including a filter configured to filter discharged air discharged from a coating chamber in which a coating object is spray-coated and collect overspray coating material included in the discharged air, and a powder dispersal means configured to disperse powder for forming a filter covering layer in the discharged air and form a filter covering layer made of a layer of the accumulated powder on a surface on the filter as the discharged air passes through the filter includes:

an exhaust treatment step of dispersing the powder stored in a supply tank in the discharged air using the powder dispersal means and causing the discharged air to pass through the filter;

a storing step of storing the coating material-containing powder that was removed from the filter through filter cleaning treatment in the exhaust treatment step in a relay tank;

a separation step of separating the coating material-containing powder in the relay tank into powder to be discarded and powder to be recycled at a set separation ratio set in advance in a fixed manner;

a discarding step of discarding the powder to be discarded that was separated in the separation step;

a recycling step of recycling the powder to be recycled that was separated in the separation step with a recycling treatment portion; and a powder refreshing step of returning the powder recycled in the recycling step to the supply tank and supplying an amount of fresh said powder that is the same as that of the powder discarded in the discarding step to the supply tank, the steps being carried out repeatedly.

Even if the above-described recycling treatment is performed each time, there is a limit to repeatedly using the powder, but with this operation method, the powder to be discarded that was separated in the separation step is discarded, fresh powder of an amount that is the same as that of the powder that was discarded is mixed into the powder resulting from the recycling treatment in a powder refreshing step, and the mixed powder is supplied from the supply tank to the powder dispersal means in an exhaust treatment step, and therefore if a suitable value is set based on experimental results, trial operation results, and the like as the set separation ratio in the separation step of separating the coating material-containing powder into powder to be discarded and powder to be recycled, the increase in the average proportion of combustible material in the mixed powder to be supplied to the powder dispersal means in the exhaust treatment step (i.e., the mixed powder in which the recycled powder and the fresh powder are mixed), the deterioration of the properties of the filter covering layer formed through accumulation of the mixed powder, and the like can be held in a fixed allowable range while taking a mode of repeatedly using the coating material-containing powder after performing the recycling treatment each time.

Also, with this operation method, in the separation step, the coating material-containing powder is separated into powder to be discarded and powder to the recycled at a set separation ratio that is set in advance in a fixed manner based on the above-described experimental results, trial operation results, and the like, and therefore compared to the case where the percentage of coating material in the coating material-containing powder is measured by a measuring apparatus and the mixing ratio of the fresh powder and the coating material-containing powder is adjusted based on the measurement result, the amount of powder to be discarded in the discarding step as the powder to be discarded and the amount of fresh powder to be supplied to the supply tank in the powder refreshing step are always constant, and in this regard, it is possible make it easier to manage the system.

Also, it is possible to avoid a case in which the mixed powder to be dispersed in the discharged air by the powder dispersion means deteriorates due to a measurement error that occurs in the measurement of the coating percentage by the measurement apparatus.

Furthermore, with this operation method, in the state in which the steps are in a steady state, the recycled powder is returned to the supply tank in the powder refreshing step and fresh powder of an amount that is the same as that of the discarded powder is supplied to the supply tank, and therefore, even if there is some variation due to the influence of the properties of the steps or the like, the amount of powder stored in the supply tank is kept at an approximately steady storage amount determined by the system properties.

Accordingly, the manager can easily check that the steps are transitioning favorably by merely monitoring that the amount of powder stored in the supply tank is kept at the steady storage amount, and in this regard, it is possible to make it easier to manage the system.

Also, with this operation method, the recycled powder and the fresh powder are mixed together in the supply tank in the powder refreshing step and mixed powder is dispersed in the discharged air from the coating chamber using the powder dispersal means in the exhaust treatment step, and therefore compared to the case of dispersing the powder obtained by mixing the coating material-containing powder that has not been subjected to the recycling treatment and the fresh powder in the discharged air using the powder dispersal means, an even more preferable filter covering layer can be formed on the filter surface, and in this regard, it is possible to ensure an even higher cleaning effect of the discharged air in the filter.

A characteristic of an "operation method for a coating exhaust treatment system" provided by a third aspect of the present invention lies in that an operation method for a coating exhaust treatment system including a filter configured to filter discharged air discharged from a coating chamber in which a coating object is spray-coated and collect overspray coating material included in the discharged air, and a powder dispersal means configured to disperse powder for forming a filter covering layer in the discharged air and form a filter covering layer made of a layer of the accumulated powder on a surface on the filter as the discharged air passes through the filter includes:

an exhaust treatment step of dispersing the powder stored in a supply tank in the discharged air using the powder dispersal means and causing the discharged air to pass through the filter;

a storing step of storing the coating material-containing powder that was removed from the filter through filter cleaning treatment in the exhaust treatment step in a relay tank;

a sorting step of sorting the coating material-containing powder in the relay tank into unsuitable powder to be discarded and suitable powder to be recycled;

a discarding step of discarding the unsuitable powder to be discarded that was sorted in the sorting step;

a recycling step of recycling the suitable powder to be recycled that was sorted in the sorting step with a recycling treatment portion; and a powder refreshing step of returning the powder recycled in the recycling step to the supply tank and supplying an amount of fresh said powder that is the same as that of the powder discarded in the discarding step to the supply tank, the steps being carried out repeatedly.

With this operation method, unsuitable powder sorted in the sorting step is discarded, fresh powder of an amount that is the same as that of the powder that was discarded is mixed into the powder resulting from the recycling treatment in the powder refreshing step, and the mixed powder is supplied from the supply tank to the powder dispersal means in the exhaust treatment step, and therefore if a suitable sorting reference and sorting method are selected as the sorting reference and sorting method in the sorting step of sorting the coating material-containing powder into unsuitable powder to be discarded (i.e., coating material-containing powder that is difficult to subject to the recycling treatment) and suitable powder to be recycled (i.e., coating material-containing powder that is relatively easy to subject to the recycling treatment), the increase in the average proportion of combustible material in the mixed powder to be supplied to the powder dispersal means in the exhaust treatment step (i.e., the mixed powder in which the recycled powder and the fresh powder are mixed), the deterioration of the properties of the filter covering layer formed through accumulation of the mixed powder, and the like can be held in a constant allowable range more effectively while obtaining a mode of repeatedly using the coating material-containing powder after performing the recycling treatment each time.

Also, with this operation method, in the state in which the steps are in a steady state, the recycled powder is returned to the supply tank in the powder refreshing step and fresh powder of an amount that is the same as that of the discarded powder is supplied to the supply tank, and therefore, even if there is some variation due to the influence of the properties of the steps or the like, the amount of powder stored in the supply tank is kept at an approximately constant steady storage amount determined by the system properties.

Accordingly, the manager can easily check that the steps are transitioning favorably by merely monitoring that the amount of powder stored in the supply tank is kept at the steady storage amount, and in this regard, it is possible to make it easier to manage the system.

Also, with this operation method, only the suitable powder sorted in the sorting step is subjected to the recycling treatment and the powder obtained by mixing the recycled powder and the fresh powder is dispersed in the discharged air from the coating chamber using the powder dispersal means in the exhaust treatment step, and therefore compared to the case of dispersing the powder obtained by mixing the coating material-containing powder that has not been subjected to the recycling treatment and the fresh powder in the discharged air using the powder dispersal means, and compared to the case of dispersing the powder obtained by mixing the powder resulting from the recycling treatment and the fresh powder in the discharged air using the powder dispersal means, an even more preferable filter covering layer can be formed on the filter surface, and in this regard, it is possible to ensure an even higher cleaning effect of the discharged air in the filter.

A characteristic of an "operation method for a coating exhaust treatment system" provided by a fourth aspect of the present invention lies in that an operation method for a coating exhaust treatment system including a filter configured to filter discharged air discharged from a coating chamber in which a coating object is spray-coated and collect overspray coating material included in the discharged air, and a powder dispersal means configured to disperse powder for forming a filter covering layer in the discharged air and form a filter covering layer made of a layer of the accumulated powder on a surface on the filter as the discharged air passes through the filter includes:

an exhaust treatment step of dispersing the powder stored in a supply tank in the discharged air using the powder dispersal means and causing the discharged air to pass through the filter;

a separation/containing step of separating and containing the coating material-containing powder that was removed from the filter through filter cleaning treatment in the exhaust treatment step in mutually different containers for each location at which the discharged air is generated;

a discarding step of discarding the coating material-containing powder that is contained in a specific container among a plurality of said containers as powder to be discarded;

a recycling step of recycling the powder contained in another container among the containers as powder to be recycled with a recycling treatment portion; and a powder refreshing step of returning the powder recycled in the recycling step to the supply tank and supplying an amount of fresh said powder that is the same as that of the powder discarded in the discarding step to the supply tank, the steps being carried out repeatedly.

In this operation method, in the coating material-containing powder that is separated at each site at which discharged air is generated in the separation step and is contained in mutually different containers, the coating material-containing powder that is contained in a specific container is discarded as the powder to be discarded, fresh powder of an amount that is the same as that of the discarded powder is mixed in the powder resulting from the recycling treatment in the powder refreshing step, and the mixed powder is supplied from the supply tank to the powder dispersal means in the exhaust treatment step, and therefore if the container stably containing the coating material-containing powder that is difficult to subject to the recycling treatment is selected from among the multiple containers as the specific container, the increase in the average proportion of combustible material in the mixed powder to be supplied to the powder dispersal means in the exhaust treatment step (i.e., the mixed powder in which the recycled powder and the fresh powder are mixed), the deterioration of the properties of the filter covering layer formed through accumulation of the mixed powder, and the like can be held in a constant allowable range more effectively while taking a mode of repeatedly using the coating material-containing powder after performing the recycling treatment each time.

Also, with this operation method, the coating material-containing powder that is contained in the specific container in the separation step is discarded as powder to be discarded, and therefore compared to the case where the percentage of coating material in the coating material-containing powder is measured by a measuring apparatus and the mixing ratio of the fresh powder and the coating material-containing powder is adjusted based on the measurement result, the amount of powder to be discarded in the discarding step as the powder to be discarded and the amount of fresh powder to be supplied to the supply tank in the powder refreshing step are always constant, and in this regard, it is possible to make it easier to manage the system.

Also, it is possible to avoid a case in which the mixed powder to be dispersed in the discharged air by the powder dispersion means deteriorates due to a measurement error that occurs in the measurement of the coating material percentage by the measurement apparatus.

Furthermore, with this operation method, in the state in which the steps are in a steady state, the recycled powder is returned to the supply tank in the powder refreshing step and fresh powder of an amount that is the same as that of the discarded powder is supplied to the supply tank, and therefore, even if there is some variation due to the influence of the properties of the steps or the like, the amount of powder stored in the supply tank is kept at an approximately steady storage amount determined by the system properties.

Accordingly, the manager can easily check that the steps are transitioning favorably by merely monitoring that the amount of powder stored in the supply tank is kept at the steady storage amount, and in this regard, it is possible to make it easier to manage the system.

Also, with this operation method, only the powder contained in the container other than the specific container (i.e., the coating material-containing powder that is easy to subject to the recycling treatment) among the plurality of containers is subjected to the recycling treatment and the powder obtained by mixing the recycled powder and the fresh powder is dispersed in the discharged air from the coating chamber using the powder dispersal means in the exhaust treatment step, and therefore compared to the case of dispersing the powder obtained by mixing the coating material-containing powder, which was not subjected to the recycling treatment, and the fresh powder in the discharged air using the powder dispersal means, and compared to the case of dispersing the powder obtained by mixing the powder resulting from the recycling treatment and the fresh powder in the discharged air using the powder dispersal means, an even more preferable filter covering layer can be formed on the filter surface, and in this regard, it is possible to ensure an even higher cleaning effect of the discharged air in the filter.

As an additional characteristic, with an "operation method for a coating exhaust treatment system" provided by aspects 1 to 4 of the present invention, in the recycling treatment portion, as the recycling treatment, heating treatment for causing a crosslinking reaction and hardening a coating material portion in the coating material-containing powder by heating the coating material-containing powder, and pulverization treatment for reducing a particle diameter of the coating material-containing powder by pulverizing the coating material-containing powder may be carried out.

In other words, the coating material-containing powder that is removed from the filter through the filter cleaning treatment (i.e., the mixture of powder and coating material that includes the overspray coating trapped by the filter covering layer) becomes viscous due to including the coating material and the particle diameters of the powder particles appear larger than those of the fresh powder due to the attachment of the coating material.

Accordingly, the coating material-containing powder is subjected to the heat treatment as described above and the coating material portion hardens due to a cross-linking reaction, and if the particle radius is adjusted through pulverization treatment, it can be brought close to that of fresh powder, and the coating material-containing powder can be re-used as the powder for forming the filter covering layer.

Due to this fact, with this operation method, it is possible ensure sufficient performance as a coating exhaust treatment system while achieving a mode in which the powder is repeatedly used.

Note that if the above-described heat treatment and pulverization treatment are carried out in a space with reduced pressure in order to carry out the operation method, a liquid portion such as a solvent included in the coating material can be more efficiently separated from the coating material portion, whereby the treatment efficiency of the recycling treatment can be increased, and the quality of the recycled powder as the powder for forming the filter covering layer can be further increased.

As a further additional characteristic, with an "operation method for a coating exhaust treatment system" provided by aspects 1 to 4 of the present invention, in the recycling treatment portion, as the recycling treatment, the heating treatment may be carried out by a heater that uses a chamber wall of a recycling chamber as a heat transfer wall as the pulverization treatment is carried out by rotating a rotary blade on the coating material-containing powder that is stored in the recycling chamber.

With this operation method, the pulverization treatment and heat treatment are performed simultaneously, and therefore it is possible to obtain an even higher treatment efficiency in the recycling treatment for the coating material-containing powder.

Also, since the heat treatment is performed using a heater that uses the chamber wall of the recycling chamber as a heat transfer wall, it is easy to make the recycling chamber air-tight, and therefore the pressure in the recycling chamber can be reduced and it is easy to realize a configuration in which the pulverization treatment and the heat treatment are performed in a space with reduced pressure as described above.

As a further additional characteristic, with an "operation method for a coating exhaust treatment system" provided by aspects 1 to 4 of the present invention, in the recycling treatment portion, as the recycling treatment, the heating treatment may be carried out by supplying hot air to a recycling chamber as the pulverization treatment is carried out through collision with a rotary striker and a fixed collider on the coating material-containing powder that is stored in the recycling chamber.

With this operation method, the pulverization treatment and heat treatment are performed simultaneously, and therefore it is possible to obtain an even higher treatment efficiency in the recycling treatment for the coating material-containing powder.

Also, with this operation method, the heat treatment is performed through supply of hot air to the recycling chamber, and therefore drying treatment for separating the liquid portion such as a solvent included in the coating material from the coating material can be performed efficiently at the same time, and in this regard as well, the treatment efficiency of the recycling treatment can be increased.

Also, the quality of the recycled powder as the powder for forming the filter covering layer can be increased.

As a further additional characteristic, with an "operation method for a coating exhaust treatment system" provided by aspects 1 to 4 of the present invention, in the recycling treatment portion, the powder resulting from the pulverization treatment and the heating treatment, or the coating material-containing powder that has not been subjected to the pulverization treatment and the heating treatment may be subjected to a fine pulverization treatment by an airflow fine powder production machine that rotates two bladed wheels arranged near each other with matching rotational axes at a high speed in a treatment chamber.

With this operation method, the powder resulting from the pulverization treatment and the heat treatment or the coating material-containing powder that has not been subjected to the pulverization treatment and the heat treatment are subjected to fine powder treatment using the airflow fine powder production machine, whereby the average particle diameter of the powder can be adjusted to a more preferable particle diameter for powder for forming a filter covering layer, and thus the quality of the recycled powder as the powder for forming the filter covering layer can be further increased.

Also, in the case where the coating material-containing powder that has not been subjected to the pulverization treatment and the heat treatment is subjected to the fine pulverization treatment, the treatment efficiency of the heat treatment carried out after the fine pulverization treatment can also be increased.

As a further additional characteristic, with an "operation method for a coating exhaust treatment system" provided by aspects 1 to 4 of the present invention, in the recycling treatment portion, as the recycling treatment, thermal decomposition treatment for thermally decomposing a coating material portion in the coating material-containing powder may be carried out by heating the coating material-containing powder to a high temperature at which a powder component does not thermally decompose.

As described above, the coating material-containing powder that is removed from the filter through the filter cleaning treatment (i.e., the mixture of powder and coating material in which the overspray coating material trapped by the filter covering layer is included) becomes viscous due to including the coating material and the particle diameters of the powder particles appear larger than those of the fresh powder due to attachment of the coating material.

Accordingly, if the coating material-containing powder is heated to a high temperature as described above and the coating material is thermally decomposed, the particle diameter can be brought close to that of fresh powder, and the coating material-containing powder can be re-used as the powder for forming the filter covering layer.

Due to this fact, with this operation method, it is possible to ensure sufficient performance as a coating exhaust treatment system while achieving a mode in which the powder is repeatedly used.

As a further additional characteristic, with an "operation method for a coating exhaust treatment system" provided by aspects 1 to 4 of the present invention, in the recycling treatment portion, as the recycling treatment, the thermal decomposition treatment may be carried out using a rotary kiln that uses a tube wall of a rotary tube containing the coating material-containing powder as a heat transfer wall, on the coating material-containing powder that is contained in the rotary tube.

With this operation method, the coating material portion in the coating material-containing powder contained in the rotary cylinder can be uniformly and efficiently subjected to thermal decomposition treatment through rotation of the rotary cylinder having cylinder walls that serve as heat transfer walls, and it is possible to obtain an even higher treatment efficiency in the recycling treatment for the coating material-containing powder.

As a further additional characteristic, with an "operation method for a coating exhaust treatment system" provided by aspects 1 to 4 of the present invention, in the recycling treatment step, the powder subjected to the thermal decomposition treatment or the coating material-containing powder that has not been subjected to the thermal decomposition treatment may be subjected to a fine pulverization treatment by an airflow fine powder production machine that rotates two bladed wheels near each other with matching rotational axes at a high speed in a treatment chamber.

With this operation method, the powder resulting from the thermal decomposition treatment or the coating material-containing powder that has not been subjected to the thermal decomposition treatment is subjected to fine powder treatment using the airflow fine powder production machine, whereby the average particle diameter of the powder can be adjusted to a more preferable particle diameter as the powder for forming the filter covering layer, and thus the quality of the recycled powder as the powder for forming the filter covering layer can be further increased.

Also, if the coating material-containing powder that has not been subjected to the thermal decomposition treatment is subjected to the fine powder treatment, the treatment efficiency of the thermal decomposition treatment carried out after the fine pulverization treatment can also be further increased.

As a further additional characteristic, with an "operation method for a coating exhaust treatment system" provided by aspects 1 to 4 of the present invention, a reception hopper that receives the coating material-containing powder that is removed and falls from the filter due to the filter cleaning treatment and a powder container that stores the coating material-containing powder that is accumulated in the reception hopper through an opening/closing valve may be provided, a powder nozzle that ejects the powder contained in the powder container into the discharged air may be provided as the powder dispersal means, in this configuration, in the first exhaust treatment step, the second exhaust treatment step, or the exhaust treatment step, after the powder is supplied to the powder container from the first supply tank, the second supply tank, or the supply tank, the powder contained in the powder container may be ejected into the discharged air by the powder nozzle serving as the powder dispersal means, and the coating material-containing powder removed from the filter through the filter cleaning treatment may be received in the reception hopper, and thereafter, the coating material-containing powder accumulated in the reception hopper may be contained in the powder container due to an operation of opening the opening/closing valve, the powder contained in the powder container may be ejected into the discharged air by the powder nozzle serving as the powder dispersal means, the coating material-containing powder that was removed from the filter through the filter cleaning treatment may be received in the reception hopper, and these steps may be repeated.

With this operation method, the powder supplied to the powder container from the first supply tank, the second supply tank, or the supply tank is first ejected into the discharged air from the coating chamber through a powder nozzle serving as the powder dispersal means, as a first instance of use in the first exhaust treatment, the second exhaust treatment, or the exhaust treatment, and thereby the filter covering layer made of a layer of accumulated powder is formed on the surface of the filter to collect the overspray coating material in the discharged air, and thereafter the powder removed from the filter through the filter cleaning treatment is received in a reception hopper.

Thereafter, as described above, in a mode in which the powder is circulated through the powder container, the powder nozzle, the filter, and the reception hopper in the stated order by repeatedly containing the powder accumulated in the hopper in the powder container through an operation of opening an opening/closing valve, ejecting the powder contained in the powder container to the discharged air from the coating chamber through a powder nozzle, and receiving the powder removed from the filter through the filter cleaning treatment in the reception hopper, the powder is repeatedly used over multiple instances in the period until the recycling treatment as the second to n-th instances of use in the same exhaust treatment step, the same second exhaust treatment step, or the same exhaust treatment step.

In other words, the powder for forming the filter covering layer can be used repeatedly in a mode of being circulated through the powder container, the powder nozzle, the filter, and the reception hopper in the stated order in the first instance of the first exhaust treatment step, the first instance of the second exhaust treatment step, or the first instance of the exhaust treatment step, separately from repeatedly being moved between the first exhaust treatment step, the second exhaust treatment step, or the exhaust treatment step, and the recycling step.

In other words, with this operation method, in each instance of the first exhaust treatment step, each instance of the second exhaust treatment step, and each instance of the exhaust treatment step, the powder is first sent to the recycling treatment portion and subjected to the recycling treatment after being used repeatedly by being circulated through the powder container, the powder nozzle, the filter, and the reception hopper in the stated order, and therefore the powder treatment amount per unit time in the recycling treatment portion can be reduced and the recycling treatment portion can be reduced in size, and it is thereby possible to reduce the manufacturing cost and operation cost of the system.

As a further additional characteristic, with an "operation method for a coating exhaust treatment system" provided by aspects 1 to 4 of the present invention, an amount of the coating material portion in the coating material-containing powder that is received per unit time by the reception hopper may be obtained as a coating material reception amount per unit time in the reception hopper, in the first exhaust treatment step, the second exhaust treatment step, or the exhaust treatment step, the coating material reception amount per unit time may be integrated accompanying time measurement, and circulated powder refreshing treatment may be performed in which when the integrated value reaches a set upper limit value, the coating material-containing powder that is accumulated in the reception hopper and the coating material-containing powder that is contained in the powder container are collected, a portion or all of the collected coating material-containing powder is sent to the recycling step, and the powder stored in the first supply tank, the second supply tank, or the supply tank is supplied to the powder container.

In other words, while repeatedly using the powder in a mode of circulating the powder through the powder container, the powder nozzle, the filter, and the reception hopper in the stated order as described above, if the above-described circulated powder refreshing treatment is delayed and the coating material portion in the powder in the circulation process becomes excessively large, the filter covering layer formed by the powder will deteriorate, and problems such as the exhaust treatment performance decreasing and the conveyance of the discharged air being hampered will occur.

Also, conversely, if the above-described cycle powder refreshing treatment is performed in a state in which the coating material portion in the powder in the cycling process is still excessively small, the powder treatment amount per unit time in the recycling treatment portion will increase, and a problem such as the recycling treatment of the powder being hampered will occur.

In contrast to this, with this operation method, when the integrated value of the coating material reception amount per unit time of the reception hopper reaches the set upper limit value, the above-described circulated powder refreshing treatment is performed, and therefore the above-described problems can be reliably avoided, whereby the system can be stably operated in a favorable state.

Also, the coating material reception amount per unit time of the reception hopper is obtained, and it is sufficient to simply integrate the coating material reception amount per unit time accompanying the time measurement, and therefore compared to the case of sequentially measuring the properties and physical amount of the coating material-containing powder received in the reception hopper and determining the needed time for the cycle powder refreshing treatment based on that measurement result, the system can be simplified, and the needed time for the circulated powder refreshing treatment can also be more accurately and stably determined.

BRIEF DESCRIPTION OF THE DRAWINGS

FIG. 6 is a table showing an operation pattern of the coating exhaust treatment system according to the first embodiment.

FIG. 7 is a table showing an operation pattern of the coating exhaust treatment system according to the second embodiment.

BEST MODE FOR CARRYING OUT THE INVENTION

First Embodiment

Figure 1:
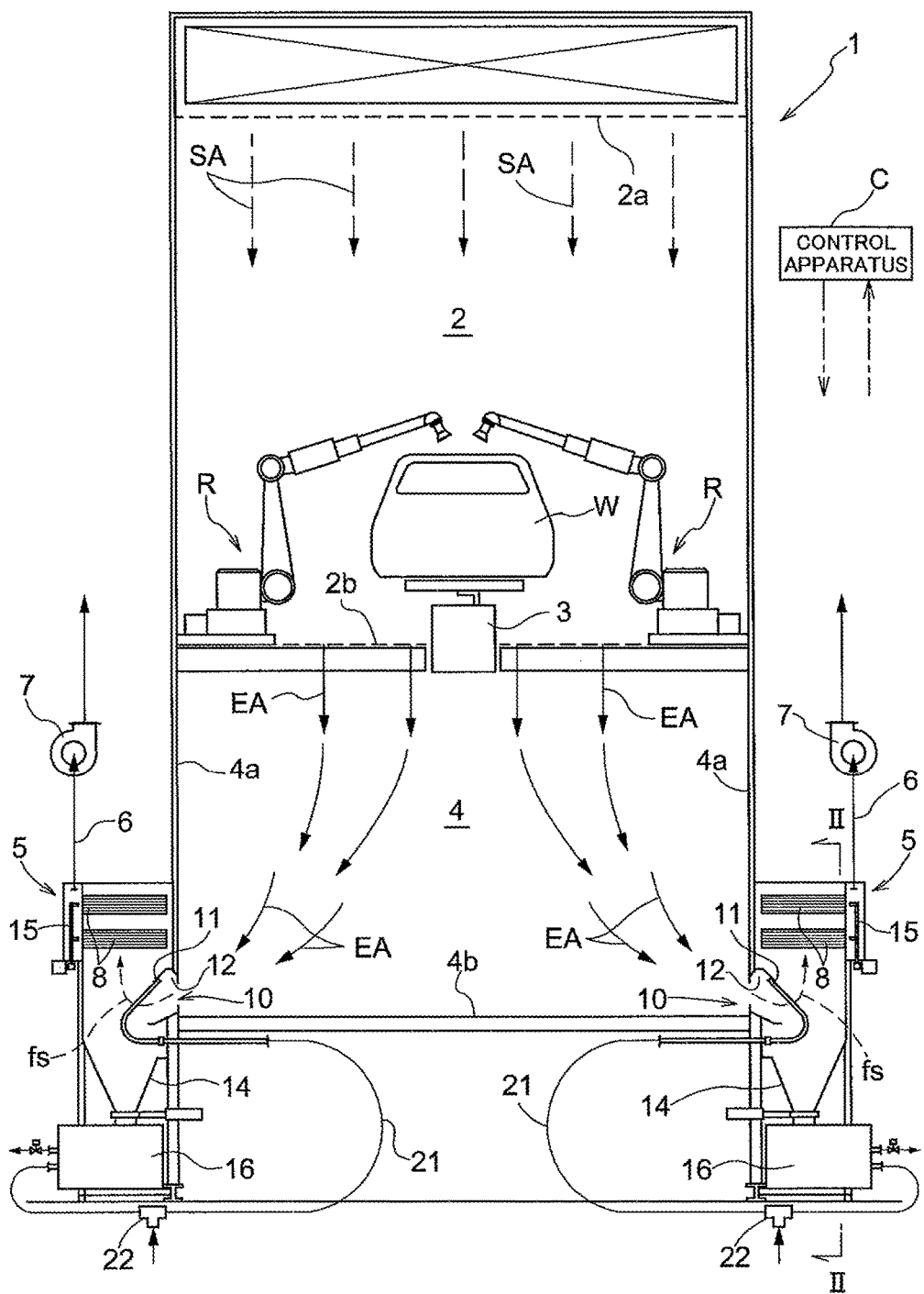
FIG. 1 is a lateral cross-sectional view of a coating booth.

FIG. 1 shows a coating booth. In a coating chamber 2 of the coating booth 1, a coating robot R or a worker is spray-coating coating objects W (in this example, an automobile body) that are sequentially conveyed into the chamber by a conveying apparatus 3.

The coating chamber 2 has a tunnel-shaped chamber-interior space that extends in the conveying direction (the far-near direction in FIG. 1) of a coating object W.

Ventilation air SA with adjusted temperature and humidity is blown downward in the coating chamber 2 from the entire surface of a ceiling portion 2a.

Accompanying the blowing of the ventilation air SA, the chamber-internal air in the coating chamber 2 including the overspray coating material is discharged as discharged air EA to a exhaust chamber 4 below the coating chamber through a perforated floor 2b.

Figure 2:
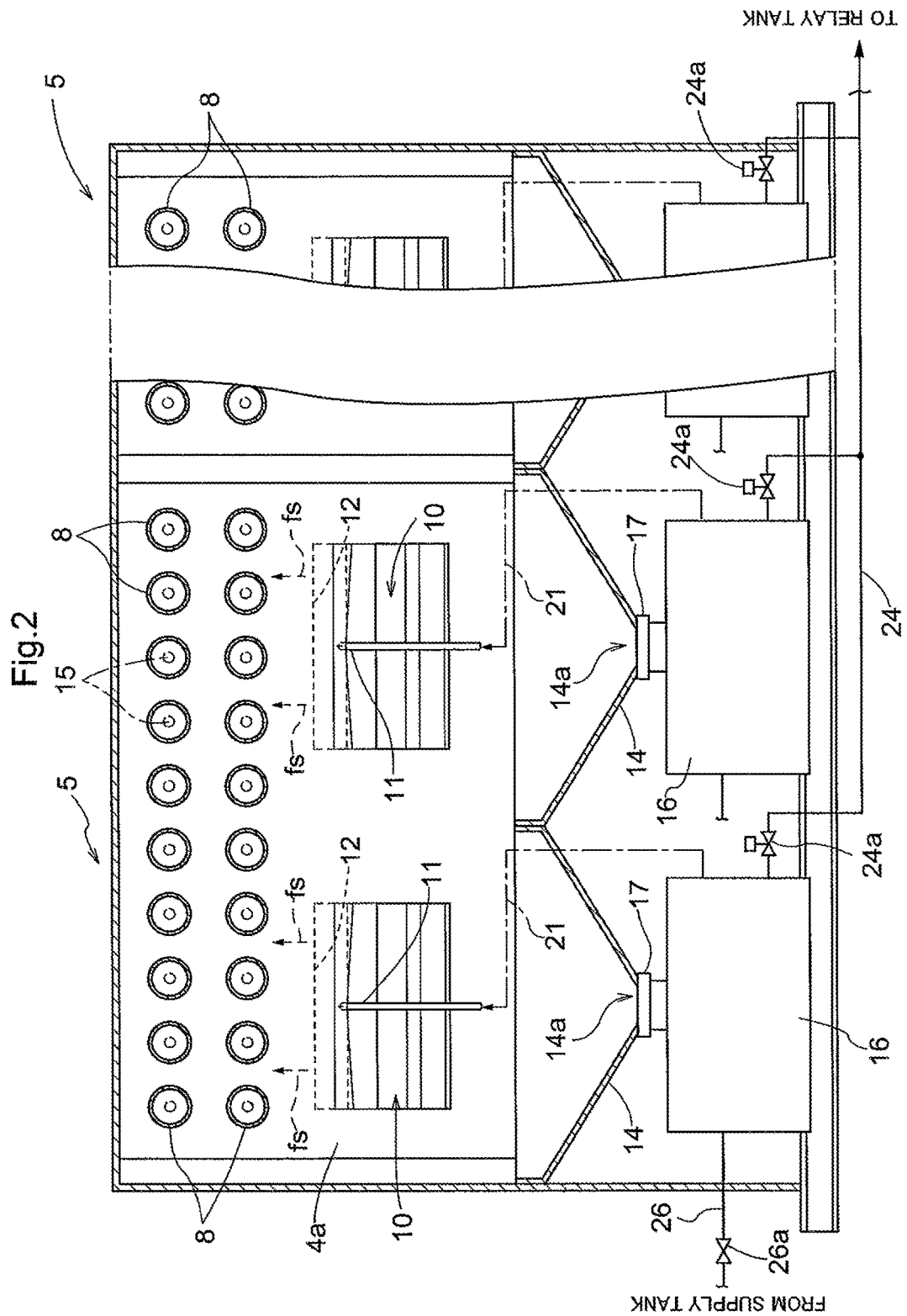
FIG. 2 is a cross-sectional view taken along line II-II in FIG. 1.

As shown in FIGS. 1 and 2, on both lateral sides of the exhaust chamber 4, filter apparatuses 5 are arranged in alignment in a coating booth lengthwise direction, which is a coating object conveying direction.

The discharged air EA is cleaned due to the overspray coating material included in the discharged air EA from the coating chamber 2 being collected by the filter apparatuses 5.

The discharged air EA cleaned by the filter apparatuses 5 is discharged to the outside by exhaust fans 7 through exhaust ducts 6 connected to the filter apparatuses 5 (or the discharged air EA is returned to the coating chamber 2 as ventilated air after having its temperature and humidity adjusted once again by an air conditioner).

Figure 3:
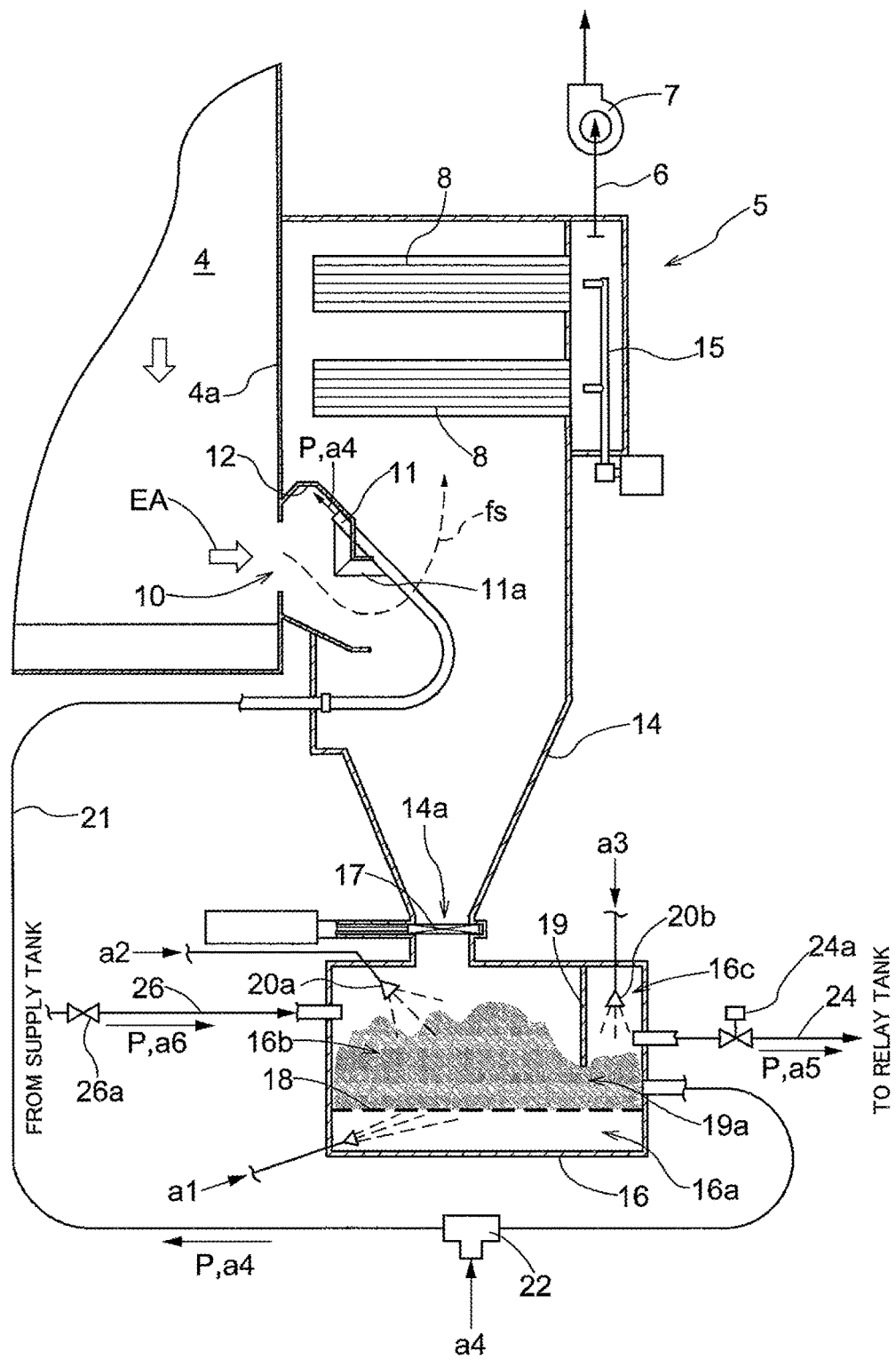
FIG. 3 is an enlarged view of an exhaust treatment portion.

As shown in FIGS. 1 to 3, multiple cylindrical filters 8 that collect the overspray coating material from the discharged air EA are arranged in alignment in a horizontal orientation inside the filter apparatuses 5.

On the side walls 4a of the exhaust chamber 4, which also serve as the apparatus walls of the filter apparatuses 5, horizontally-elongated rectangular influx ports 10 through which the discharged air EA from the coating chamber 2 is introduced from the exhaust chamber 4 into the filter apparatuses 5 are formed.

The influx ports 10 are formed in alignment in a line in the coating booth lengthwise direction.

In the influx ports 10, powder nozzles 11 are arranged as powder dispersal means for dispersing powder P for forming a filter covering layer in the discharged air EA introduced into the filter apparatuses 5 through the influx ports 10.

In other words, multiple exhaust treatment airways fs (i.e., exhaust treatment airways fs that include the powder nozzles 11 and the filters 8 connected thereto) leading from the influx ports 10 to the filters 8 are formed in an aligned arrangement in the coating booth lengthwise direction in the filter apparatuses 5.

In other words, by dispersing the powder P in the discharged air EA through ejection from the powder nozzles 11, filter covering layers made of layers of accumulated powder P are formed on the surfaces of the filters 8 as the discharged air EA passes through the filters 8.

Also, by trapping the overspray coating material in the discharged air EA using the filter apparatuses, a case is prevented in which the overspray coating material directly sticks to the filter materials of the filters 8 when the overspray coating material is collected by the filters 8.

Retention recesses 12 with lateral cross-sectional shapes that open downward are formed on the upper walls of the influx ports 10 of the filter apparatuses 5.

The retention recesses 12 are formed along the entire width of the influx ports 10 in the state of being continuous in the lateral width direction (i.e., the booth lengthwise direction) of the influx ports 10.

The powder nozzles 11 serving as the powder dispersal means eject the powder P along with carrier air a4 from the central locations in the lateral width direction of the influx ports 10 to the far inner surfaces of the retention recesses 12.

That is, in the state in which the flow of the discharged air EA in the influx ports 10 passes near the downward openings of the retention recesses 12, the powder P along with the carrier air a4 is ejected toward the far inner surfaces of the retention recesses 12 by the powder nozzles 11 as described above, whereby swirling retention that lasts for an appropriate period of airflow accompanying the powder P occurs in the retention recesses 12.

The ejected powder P is dispersed in the lateral width direction of the influx ports 10 in the retention recesses 12 while the powder P is stirred due to the swirling retention.

Also, by gradually taking in the dispersed powder P into a passing flow of the discharged air EA in the influx ports 10 through the downward openings of the retention recesses 12, the powder P is included in the discharged air EA in a state of being uniformly dispersed in the lateral width direction of the influx port 10.

Reference numeral 11a denotes a triangular plate-shaped dispersion auxiliary tool attached to the powder nozzle 11.

By providing the dispersion auxiliary tool 11a, the flow of the discharged air EA that passes through the influx port 10 and the air that is retained in a swirling manner in a state of accompanying the powder P in the retention recesses 12 is split in the state of accompanying a change in orientation to one side or the other side in the lateral width direction of the influx ports 10.

Then, dispersion of the powder P in the influx port lateral width direction in the retention recesses 12 is further promoted due to the change in orientation of the discharged air EA and the swirling retained air accompanying the split. Also, the dispersion of the powder P in the process of taking in the powder P from the retention recesses 12 to the passing flow of the discharged air EA is also promoted.

Inverted pyramid-shaped or inverted cone-shaped reception hoppers 14 are arranged in alignment with no gaps in the booth lengthwise direction on the bottom portion, which is lower than the influx ports 10, below the filters 8 inside of the filter apparatus 5, in a state of individually corresponding to the filters 8 of the exhaust treatment airways fs.

Powder discharge ports 14a are formed on the bottom portions of the reception hoppers 14.

Also, the filter apparatuses 5 are equipped with filter cleaning apparatuses 15 that apply compressed air in a pulse-wise manner to the filters 8 in a backwash state of being in an orientation opposite to the direction in which the discharged air EA passes therethrough.

By causing the filter cleaning apparatuses 15 to operate for an appropriate amount of time, the filter covering layers with a large airflow resistance due to the trapping of the overspray coating material and excessive accumulation of the powder P are removed from the filters 8 through the filter cleaning treatment, and the filters 8 are renewed.

The filter covering layers (i.e., the coating material-containing powder P, which includes the trapped overspray coating material) that fall off of the filters 8 due to the filter cleaning treatment are received in the reception hoppers 14 below the filters.

Powder tanks 16 are linked as powder containers for powder circulation below the reception hoppers 14.

The coating material-containing powder P received in the reception hoppers 14 falls into the powder tanks 16 through the powder discharge ports 14a on the reception hopper bottom portions.

Partitioning doors 17 in a horizontal orientation are provided between the reception hoppers 14 and the powder tanks 16 as opening/closing valves that open and close the powder discharge ports 14a.

That is, due to an operation of opening the partitioning door 17, the coating material-containing powder P that is received in the reception hopper 14 falls inside of the powder tank 16 and is contained in the tank.

Also, the powder tank 16 in the powder-containing state is hermetically sealed through an operation of closing the partitioning door 17.

Air diffusion plates 18 are arranged spanning the entirety of the powder tanks 16 in plan view on the bottom portions of the powder tanks 16.

The air diffusion plates 18 are formed of an air-permeable material that allows the passage of pressurized air due to the existence of closely-arranged fine air holes.

The inner portion of the powder tank 16 is partitioned into a pressurized air chamber 16a on the lower side and a powder containing chamber 16b on the upper side by the air diffusion plate 18.

Stirring air a1 is pressurized and supplied through the airway to the pressurized air chamber 16a on the lower side.

On the other hand, the powder containing chamber 16b communicates with the reception hopper 14 through the powder discharge port 14a due to an operation of opening the partitioning door 17.

Also, a powder dispensing chamber 16c that is adjacent to the powder containing chamber 16b is formed on the upper side of the pressurized air chamber 16a inside of the powder tank 16.

A diaphragm opening 19a is formed as a communication port that allows the powder containing chamber 16b and the powder dispensing chamber 16c on the lower end portion of the partitioning wall 19 that partitions the powder containing chamber 16b and the powder dispensing chamber 16c.

The diaphragm opening 19a uses airflow resistance to restrict the influx amount of the powder P that flows into the powder dispensing chamber 16c together with the air from the powder containing chamber 16a.

Also, the stirring nozzles 20a and 20b that eject the stirring air a2 and a3 supplied through the airway into the chambers are equipped in the powder containing chamber 16b and the powder dispensing chamber 16c.

In other words, in the powder containing chamber 16b of the powder tank 16, the powder P contained in the powder containing chamber 16b is raised in the dispersed state and caused to float in the chamber using the stirring air a1 ejected upward to the powder containing chamber 16b through the air diffusion plates 18 from the pressurized air chamber 16a.

Also, the chamber-internal air is put in the state of being stirred in a convective flow by the stirring air a2 ejected from the stirring nozzle 20a, and the powder P in the floating state in the powder containing chamber 16b is stirred in a convective flow.

Accordingly, put simply, in the powder tank 16 that is hermetically sealed due to the partitioning door 17 being closed, the powder P in the powder containing chamber 16b does not stop its fluid motion, and is kept in a uniform floating and dispersed state (i.e., a state in which the powder concentration in the air in the powder containing chamber 16b is uniform).

The powder P in the floating and dispersed state in the powder containing chamber 16b is dispensed to the outside of the tank through the diaphragm opening 19a of the partitioning wall 19 and the powder dispensing chamber 16c.

At this time, due to the airflow resistance of the diaphragm opening 19a, the uniform floating and dispersed state of the powder P in the powder containing chamber 16b is kept stable and the powder P in the floating and dispersed state is caused to flow stably from the powder containing chamber 16b to the powder dispensing chamber 16c.

Also, in the powder dispensing chamber 16c as well, the powder P in the powder dispensing chamber 16c is kept in the uniform floating and dispersed state using the stirring air a1 ejected upward from the air diffusion sheets 18 and the stirring air a3 ejected from the stirring nozzle 20b.

The powder supply paths 21 by which the powder P is supplied to the corresponding powder nozzles 11 are connected to the powder dispensing chambers 16c of the powder tanks 16.

The coating material-containing powder P contained in the powder containing chambers 16b of the powder tanks 16 is ejected from the corresponding powder nozzles 11 through the powder dispensing chambers 16c and the powder supply paths 21.

Accordingly, for each parallel exhaust treatment airway fs in the filter apparatuses 5, the powder P is repeatedly used in the exhaust treatment airways fs in a mode of circulating the powder P through the powder nozzles 11→the filters 8→the reception hoppers 14→the powder tanks 16→the powder supply paths 21, in the stated order.

Ejectors 22 serving as ejection air conveying means are disposed on the powder supply paths 21 to the powder nozzles 11.

Due to the negative pressure formed accompanying the passage of the compressed air a4 supplied through the airways, the ejectors 22 suction the powder P in the powder containing chambers 16b of the powder tanks 16 through the powder dispersing chambers 16c.

Also, the ejectors 22 use the compressed air a4 resulting from the negative pressure formation as carrier air and supply the suctioned powder P together with the carrier air a4 through the powder supply paths 21 to the powder nozzles 11.

The powder nozzles 11 eject the powder P supplied by the ejectors 22 together with the carrier air a4 toward the far portions of the stirring recesses 12 in the influx ports 10.

In other words, in order to supply the powder P to the powder nozzles 11, the powder P is put in a uniform floating and dispersed state in the powder tank 16 as described above, and the powder P in the floating and dispersed state is supplied to the powder nozzles 11 together with the carrier air a4 through the powder supply paths 21 by the ejectors 22, whereby the floating and dispersed state of the powder P in the carrier air on the powder supply paths 21 (i.e., the powder concentration in the carrier air) is effectively made uniform, and thus the powder P is ejected in a uniform dispersed state from the powder nozzles 11.

When the amount of the powder P remaining in the powder tank 16 decreases to a certain degree, the partitioning door 17 is opened, and the coating material-containing powder P that has accumulated in the reception hopper 14 due to the filter cleaning treatment while the partitioning door 17 was in the closed state falls into and is contained in the powder containing chamber 16b of the powder tank 16.

Thereafter, in a state in which the powder tank 16 is hermetically sealed due to the partitioning door 17 being closed again, the powder P in the powder containing chamber 16b is put in a uniform floating and dispersed state, and the powder P is supplied to the powder nozzle 11 through the powder supply path 21.

The powder supply paths 21 to the corresponding powder nozzles 11 are connected to the powder dispensing chambers 16c of the powder tanks 16, and the powder discharge paths 24 are also connected to the same.

The powder discharge paths 24 lead the coating material-containing powder P and the carrier air a5 in the powder containing chambers 16b of the powder tanks 16 to the relay tanks 23.

Also, the opening/closing valves 24a for dispensing the powder are disposed on the powder dispensing paths 24.

Note that the powder discharge paths 24 may be directly connected to the powder containing chambers 16b instead of being connected to the powder dispensing chambers 16c.

On the other hand, powder supply paths 26 may be connected to the powder containing chambers 16b of the powder tanks 16.

The powder supply paths 26 lead the powder P and the carrier air a6 from the supply tanks 25A and 25B to the powder containing chambers 16b. Also, the opening/closing valves 26a for dispensing the powder are disposed on the powder supply paths 26.

In other words, due to the opening or closing operation of the opening/closing valves 24a and 26b, a circulated powder refreshing treatment is performed in which the powder P that is circulated through the powder nozzles 11→the filters 8→the reception hoppers 14→the powder tanks 16→the powder supply paths 21 in the stated order is refreshed in each parallel exhaust treatment airway fs in the filter apparatuses 5.

Specifically, the amounts of coating material in the coating material-containing powder P received by the reception hoppers 14 due to the filter cleaning treatment per unit time are obtained for each reception hopper 14 (i.e., for each exhaust treatment airway fs) as coating material reception amounts per unit time in the reception hoppers 14.

In the exhaust treatment step in which the powder P is dispersed in the discharged air EA from the coating chamber 2 through ejection from the powder nozzles 11, the coating material reception amounts m per unit time are integrated for each reception hopper 14 accompanying time measurement.

Also, in one of the reception hoppers 14, when the integrated value $\Sigma m$ reaches a set upper limit value M ($\Sigma m = M$), the powder P accumulated at that time in the reception hopper 14 is contained in the corresponding powder tank 16 through an opening operation of the partitioning door 17.

Also, after the containing, the partitioning door 17 is closed once again, and the opening and closing valve 24a for discharging the powder for the powder tank 16 is opened so that the powder P contained in the powder tank 16 (i.e., the powder P being circulated in the exhaust treatment airway fs) is collected in the relay tank 23 through the powder discharge path 24.

After the collecting, the opening and closing valve 26a for supplying powder to the powder tank 16 is opened, whereby a predetermined amount of the powder P (i.e., the powder P that is to be circulated through the powder nozzle 11→the filter 8→the reception hopper 14→the powder tank 16→the powder supply path 21 in the stated order thereafter) is supplied to the powder tank 16 from the supply tanks 25A and 25B through the powder supply paths 26.

When the supply of the powder P from the supply tanks 25A and 25B to the powder tank 16 is complete, the integrated value $\Sigma m$ for the reception hopper 14 corresponding to the powder tank 16 is reset (Σm→0), and thereafter the processing is returned to the exhaust treatment step in which the powder P contained in the powder tank 16 is ejected from the corresponding powder nozzle 11 and is dispersed in the discharged air EA.

Also, accompanying this return, the addition of the coating material reception amount per unit time is started once again for the corresponding reception hopper 14.

Figure 4:
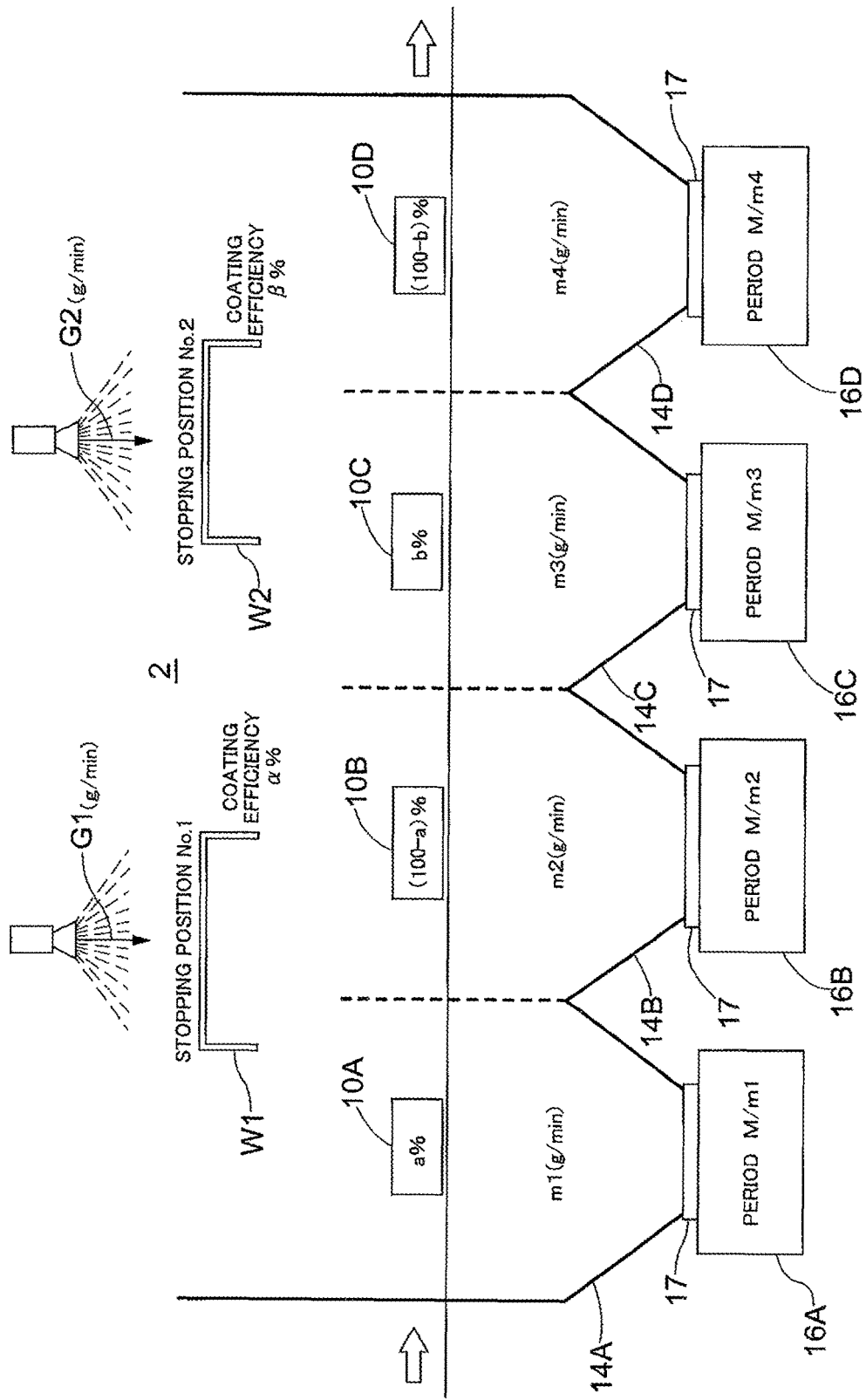
FIG. 4 is a diagram illustrating a state of calculating a coating material reception amount per unit time.

To give further description of the circulated powder refreshing treatment, for example, in the case where spray coating at a spray coating rate G1 (g/min) is carried out on the coating object W1 at stopping position No. 1 in the coating chamber 2 as shown in FIG. 4 and spray coating at a spray coating rate G2 (g/min) is carried out on the coating object W2 at stopping position No. 2, it is assumed that the coating efficiency of the coating object W1 at stopping position No. 1 is α(%) and the coating efficiency of the coating object W2 at stopping position No. 2 is β(%).

Also, the stopping position No. 1 is assumed to be a position at which a % of the overspray coating material produced by the spray coating performed on the coating object W 1 passes through the first influx port 10A together with the discharged air EA from the coating chamber 2, and (100−a) % of the overspray coating material passes through the second influx port 10B together with the discharged air EA from the coating chamber 2.

Similarly, the stopping position No. 2 is assumed to be a position at which b % of the overspray coating material produced by the spray coating performed on the coating object W 2 passes through the third influx port 10C together with the discharged air EA from the coating chamber 2, and (100−b)% of the overspray coating material passes through the fourth influx port 10D together with the discharged air EA from the coating chamber 2.

In this case, the coating material amounts m1 to m4 per unit time in the first to fourth reception hoppers 14A to 14D are as follows:

$$m1 = G1 \times (100-\alpha)/100 \times a/100$$

$$m2 = G1 \times (100-\alpha)/100 \times (100-a)/100$$

$$m3 = G2 \times (100-\beta)/100 \times b/100$$

$$m4 = G2 \times (100-\beta)/100 \times (100-b)/100$$

Accordingly, in the state in which the set upper limit value M is set, the periods M/m1 to M/m4 (mins) of carrying out the cycle powder refreshing treatment in the first to fourth powder tanks 16A to 16D corresponding to the first to fourth reception hoppers 14A to 14D are as follows.

$$M/m1 = M/(G1 \times (100-\alpha)/100 \times a/100)$$

$$M/m2 = M/(G1 \times (100-\alpha)/100 \times (100-a)/100$$

$$M/m3 = M/(G2 \times (100-\beta)/100 \times b/100)$$

$$M/m4 = M/(G2 \times (100-\beta)/100 \times (100-b)/100)$$

Incidentally, although the circulated powder refreshing treatment is carried out automatically by the control apparatus C, the coating material reception amount m per unit time for each reception hopper 14 becomes a different value when the coating conditions on the coating object W changes and the coating object stopping position in the coating chamber 2, the spray coating material amount, the coating efficiency, and the like change.

Due to this fact, the coating material reception amount m per unit time for each reception hopper 14 is stored in the control apparatus C upon being obtained in advance through experimentation or the like under each coating condition to be employed, and if there is a change in the coating conditions, in response, the control apparatus C changes the coating material reception amount m per unit time for each reception hopper 14, and continues integrating the coating material reception amount m per unit time.

Also, instead of calculating the coating material reception amount m per unit time for each reception hopper 14 in advance and storing it in the control apparatus C, the control apparatus C may calculate the coating material reception amount m per unit time for each reception hopper 14 according to the coating condition to be employed.

Figure 5:
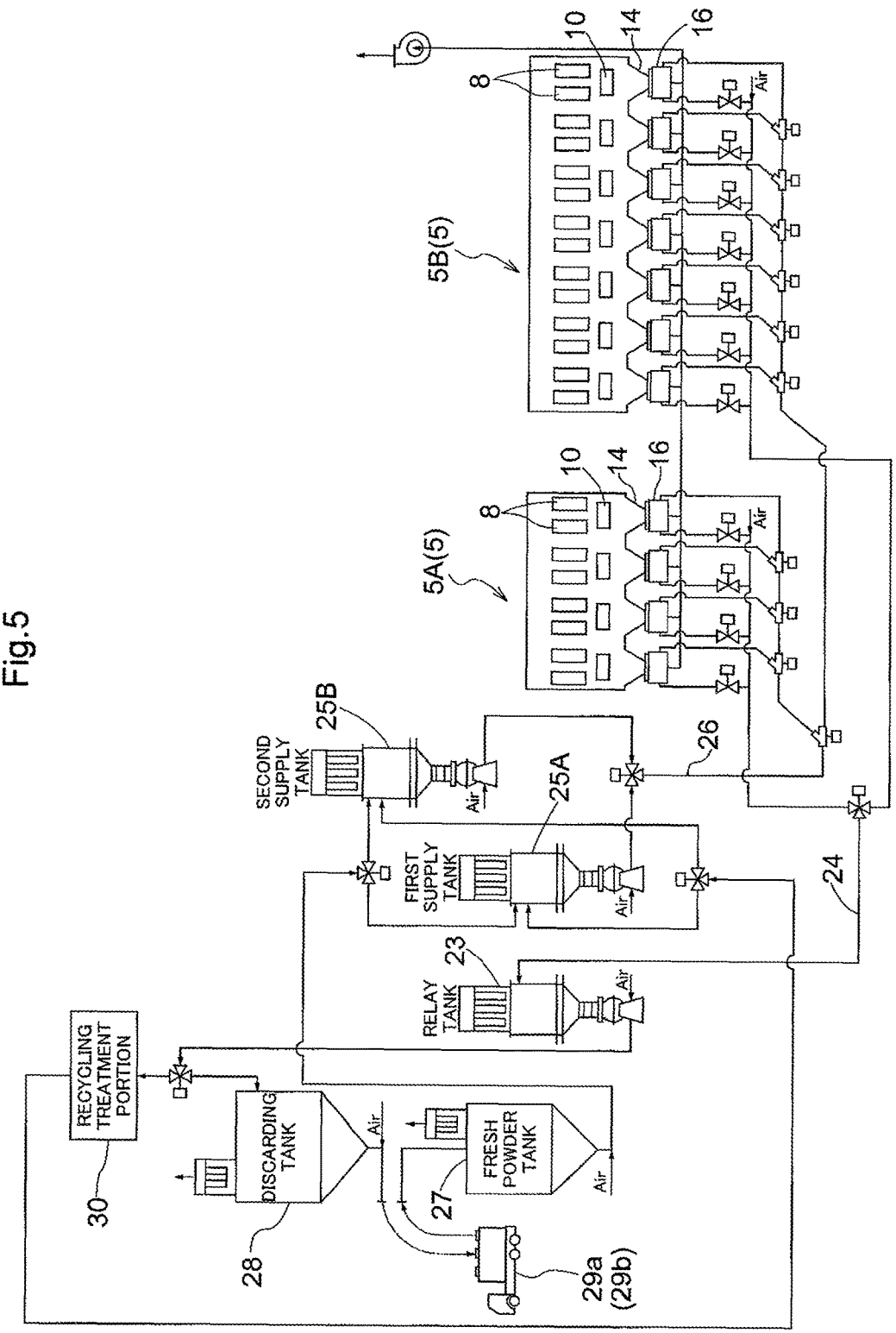
FIG. 5 is a system configuration diagram showing a coating exhaust treatment system according to first and second embodiments.

FIG. 5 shows an overall configuration of a coating exhaust treatment system according to a first embodiment, and FIGS. 5A and 5B show filter apparatuses 5 that are equipped in two coating step portions in the coating booth.

The two filter apparatuses 5A and 5B each include the above-described parallel exhaust treatment airway fs.

In other words, with the filter apparatuses 5A and 5B, the overspray coating material included in the discharged air EA from the coating chamber 2 is collected in a state of circulating the powder P through the powder nozzles 11→the filters 8→the reception hoppers 14→the powder tanks 16→the powder supply paths 21 in the stated order for each parallel exhaust treatment airway fs.

Reference numerals 25A and 25B indicate first and second supply tanks that supply the powder P through the powder supply paths 26 to the multiple powder tanks 16 in the two filter apparatuses 5A and 5B.

Reference numeral 23 indicates a relay tank in which the coating material-containing powder P is collected through the powder discharge paths 24 from the multiple powder tanks 16 in the two filter apparatuses 5A and 5B.

Reference numeral 27 indicates a fresh powder tank that stores fresh powder P, and reference numeral 28 indicates a discarding tank that stores used powder P to be discarded.

The fresh powder P brought in by a transport vehicle 29a is stored in the fresh powder tank 27.

On the other hand, the used powder P stored in the discarding tank 28 is taken out by a transport vehicle 29b and discarded.

Reference numeral 30 indicates a recycling treatment portion. In the recycling treatment portion 30, the coating material-containing powder P that was collected in the relay tank 23 is subjected to recycling treatment.

With this coating exhaust treatment system, a first operation and a second operation are carried out alternatingly each working day.

Also, in the first operation, the following steps a1, b1, and c1 are carried out, and in the second operation, the following steps a2, b2, and c2 are carried out.

First Operation (a1) First Exhaust Treatment Step

In the first exhaust treatment step, the powder P supplied from the first supply tank 25A (i.e., the powder P supplied from the first supply tank 25A to the powder tank 16 in the filter apparatuses 5A and 5B) is dispersed in the discharged air EA from the coating chamber 2 using the powder nozzles 11 serving as the powder dispersal means in each parallel exhaust treatment airway fs in the filter apparatuses 5A and 5B, and the discharged air EA is passed through the filters 8 in the filter apparatuses 5A and 5B.

In the first exhaust treatment step, when the integrated value Σm of the coating material reception amount m per unit time reaches the set upper limit value M in a reception hopper 14 in the filter apparatuses 5A and 5B, the above-described circulated powder refreshing treatment is executed.

In other words, with the circulated powder refreshing treatment, the powder P accumulated at that time in the reception hopper 14 and the powder P contained at that time in the corresponding powder tank 16 is collected in the relay tank 23, and the powder P stored in the first supply tank 25A is supplied to the powder tank 16 after the powder is collected.

(b1) First Recycling Step

In the first recycling step, the coating material-containing powder P that is stored in the relay tank 23 in the previous second operation is subjected to recycling treatment by the recycling treatment portion 30. Also, the powder P resulting from the recycling treatment is stored in the second supply tank 25B.

(c1) First Storing Step

In the first storing step, the coating material-containing powder P that was removed from the filter 8 through the filter cleaning treatment in the first exhaust treatment step (i.e., the coating material-containing powder P collected from the powder tank 16 through the circulated powder refreshing treatment carried out by the filter apparatuses 5A and 5B in the first exhaust treatment step) is stored in the relay tank 23 after the coating material-containing powder P in the tank is sent to the recycling treatment portion 30 in the first recycling step.

Second Operation (a2) Second Exhaust Treatment Step

In the second exhaust treatment step, the powder P supplied from the second supply tank 25B (i.e., the powder P supplied from the second supply tank 25B to the powder tank 16 in the filter apparatuses 5A and 5B) is dispersed in the discharged air EA from the coating chamber 2 using the powder nozzles 11 serving as the powder dispersal means in each parallel exhaust treatment airway fs in the filter apparatuses 5A and 5B, and the discharged air EA is passed through the filters 8 in the filter apparatuses 5A and 5B.

Similarly to the first exhaust treatment operation, in the second exhaust treatment step, the above-described circulated powder refreshing treatment is executed when the integrated value Σm of the coating material reception amount m per unit time reaches the set upper limit value M in one of the reception hoppers 14 of the filter apparatuses 5A and 5B.

That is, in the circulated powder refreshing treatment, the powder P accumulated at that time in the reception hopper 14, the powder P contained at that time in the corresponding powder tank 16 is collected in the relay tank 23, and the powder P stored in the second supply tank 25B is supplied to the powder tank 16 after the powder is collected.

(b2) Second Recycling Step

In the second recycling step, the coating material-containing powder P that was stored in the relay tank 23 in the previous first operation is subjected to recycling treatment by the recycling treatment portion 30. Also, the powder P resulting from the recycling treatment is stored in the first supply tank 25A.

(c2) Second Storing Step

In the second storing step, the coating material-containing powder P that was removed from the filter 8 through the filter cleaning treatment in the second exhaust treatment step (i.e., the coating material-containing powder P collected from the powder tank 16 through the circulated powder refreshing treatment carried out by the filter apparatuses 5A and 5B in the second exhaust treatment step) is stored in the relay tank 23 after the coating material-containing powder P in the tank is sent to the recycling treatment portion 30 in the second recycling step.

Also, when repeatedly carrying out the first operation and the second operation alternatingly, the first operation refreshing treatment is carried out upon the number of repetitions n1 of the first operation reaching the set number ns (in this example, ns=6).

In other words, with the first operation refreshing treatment, the coating material-containing powder P stored in the relay tank 23 in the first storing step is moved (discarded) to the discarding tank 28 without being subjected to the recycling treatment as powder that has reached its usage limit, and fresh powder P is supplied from the fresh powder tank 27 to the first supply tank 25A after the powder P is supplied to the powder tanks 16 in the filter apparatuses 5A and 5B in the first exhaust treatment step, and thereafter the number of repetitions n1 of the first operation is reset (n1→0.

Similarly, when the number of repetitions n2 of the second operation reaches the above-described set number ns (in this example, ns=6), the second operation refreshing treatment is carried out.

In other words, with the second operation refreshing treatment, the coating material-containing powder P stored in the relay tank 23 in the second storing step is moved (discarded) to the discarding tank 28 without being subjected to the recycling treatment as powder that has reached its usage limit, and fresh powder P is supplied from the fresh powder tank 27 to the second supply tank 25B after the powder P is supplied to the powder tanks 16 in the filter apparatuses 5A and 5B in the second exhaust treatment step, and thereafter the number of repetitions n2 of the second operation is reset (n2→0).

FIG. 6 diagrammatically shows an operation pattern of the first operation and the second operation in the coating exhaust treatment system of the first embodiment, the first operation being indicated by solid-line arrows, and the second operation being indicated by broken-line arrows.

As shown in FIG. 6, in the coating exhaust treatment system of the first embodiment, the number of repetitions n2 of the second operation is set to reach the set number ns in the second operation (in this example, the second operation on the twelfth day) following the first operation (in this example, the first operation on the eleventh day) in which the number of repetitions n1 reaches the set number ns.

Accordingly, the first operation refreshing treatment and the second operation refreshing treatment are always focused in the same period.

Note that the alternating execution of the first operation and the second operation, and the first operation refreshing treatment and second operation refreshing treatment are automatically carried out along with the circulated powder refreshing treatment in the filters 5A and 5B by the control apparatus C.

Second Embodiment

The exhaust treatment system of the second embodiment has the same system configuration (the system configuration shown in FIG. 5) as the exhaust treatment system of the first embodiment and only the operation pattern of the first operation and the second operation is different in its operation.

FIG. 7 diagrammatically shows an operation pattern of the second operation and the second operation in the coating exhaust treatment system of the first embodiment, the first operation being indicated by solid-line arrows, and the second operation being indicated by broken-line arrows.

As shown in FIG. 7, with the coating exhaust treatment system of the second embodiment, the number of repetitions n2 of the second operation is set to reach the set number ns in the second operation (in the present example, the second operation on the sixth day), which is carried out following the first operation (in the present example, the first operation on the fifth day), in which the number of repetitions n1 reaches about half of the set number ns.

Also, the number of repetitions n1 of the first operation is set to reach the set number ns in the first operation that is carried out following the second operation (in the present example, the second operation on the tenth day), in which the number of repetitions n2 reaches about half of the set number ns.

In other words, by doing so, the average variation range in the number of instances of recycling treatment of the powder P dispersed in the discharged air EA from the coating chamber 2 by the powder nozzles 11 in the filter apparatuses 5A and 5B is reduced, and the stability of the system performance is increased.

Note that in order to displace the operation period of the first operation refreshing treatment and the operation period of the second operation refreshing treatment, the operation timing of the first operation refreshing treatment and the operation timing of the second operation refreshing treatment need only be adjusted intentionally in the initial period of the alternating operation in which the first operation and the second operation are repeatedly carried out alternatingly.

Points other than this are the same as those of the exhaust treatment system of the first embodiment.

Third Embodiment

Figure 8:
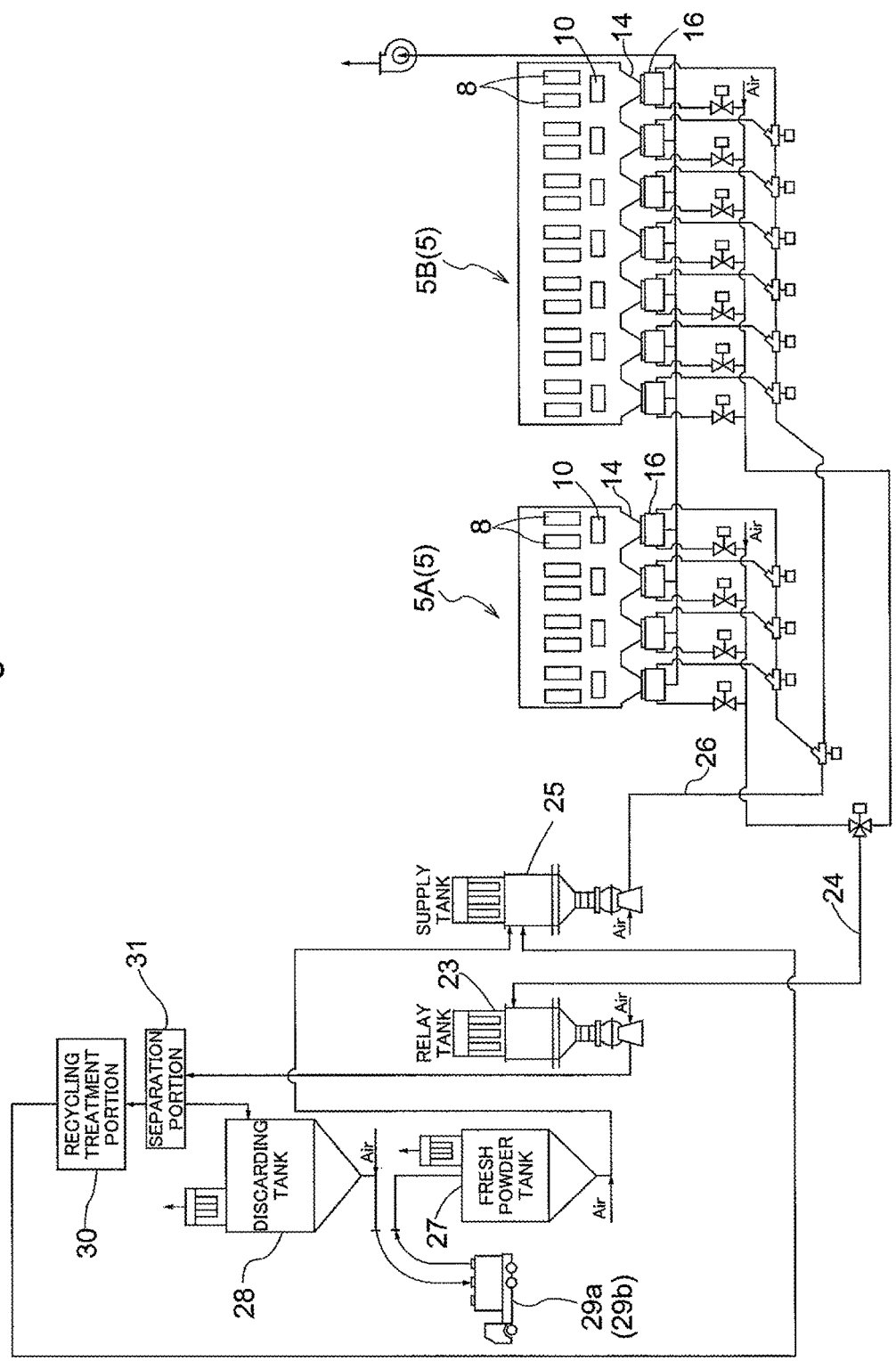
FIG. 8 is a system configuration diagram showing a coating exhaust treatment system according to a third embodiment.

FIG. 8 shows an overall configuration of a coating exhaust treatment system according to a third embodiment.

Similarly to the first embodiment and the second embodiment, in this coating exhaust treatment system, reference numerals 5A and 5B denote filter apparatuses 5 that are equipped in two coating step portions in the coating booth 1.

The two filter apparatuses 5A and 5B each include the above-described parallel exhaust treatment airway fs.

Also, in each of the exhaust treatment airways fs, the overspray coating included in the discharged air from the coating chamber 2 is collected in a state of circulating the powder P through the powder nozzles 11→the filters 8→the reception hoppers 14→the powder tanks 16→the powder supply paths 21, in the stated order.

Reference numeral 25 denotes a supply tank that supplies the powder P to the multiple powder tanks 16 of the two filter apparatuses 5A and 5B through the powder supply paths 26.

Reference numeral 23 indicates a relay tank in which the coating material-containing powder P is collected through the powder discharge paths 24 from the multiple powder tanks 16 in the two filter apparatuses 5A and 5B.

Also, reference numeral 27 indicates a fresh powder tank that stores fresh powder P, and reference numeral 28 indicates a discarding tank that stores used powder P to be discarded.

The fresh powder P brought in by a transport vehicle 29a is stored in the fresh powder tank 27.

On the other hand, the used powder P stored in the discarding tank 28 is taken out by a transport vehicle 29b and discarded.

Reference numeral 31 denotes a separation portion that separates the coating material-containing powder P in the relay tank 23 into the powder to be discarded and the powder to be recycled.

The coating material-containing powder P that is to be discarded and was separated by the separation portion 31 is transferred to the discarding tank 28 and discarded.

On the other hand, the coating material-containing powder P that is to be recycled and was separated by the separation portion 31 is sent to the recycling treatment portion 30 and is subjected to the recycling treatment.

Figure 9:
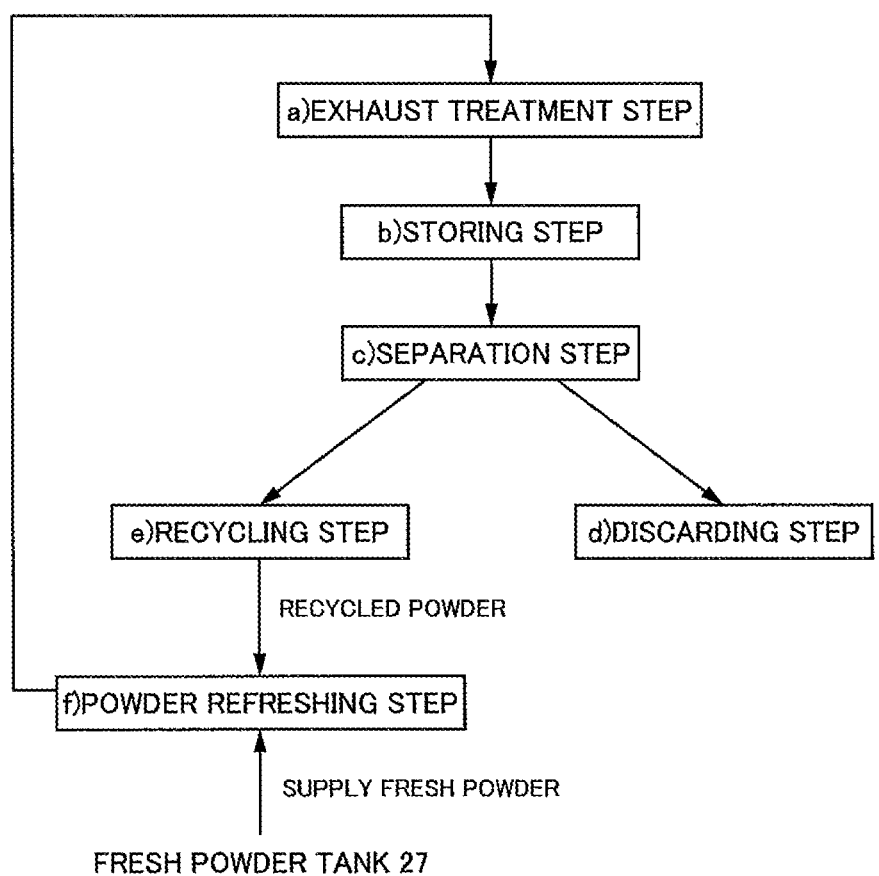
FIG. 9 is a flowchart showing an operation pattern of the coating exhaust treatment system according to the third embodiment.

With the coating exhaust treatment system of the third embodiment, as shown in FIG. 9, each of the following steps a to f are carried out repeatedly.

(a) Exhaust Treatment Step

In the exhaust treatment step, in each parallel exhaust treatment airway fs in the filter apparatuses 5A and 5B, the powder P supplied from the supply tank 25 (i.e., the powder P supplied from the supply tank 25 to the powder tanks 16 in the filter apparatuses 5A and 5B) is dispersed in the discharged air EA from the coating chamber 2 by the powder nozzles 11 serving as the powder dispersal means, and the discharged air EA is passed through the filters 8 in the filter apparatuses 5A and 5B.

(b) Storing Step

In the storing step, the coating material-containing powder P that was removed from the filters 8 of the filter apparatuses 5A and 5B through the filter cleaning treatment in the exhaust treatment step is stored in the relay tank 23.

Specifically, in the first exhaust treatment step, when the integrated value $\Sigma m$ of the coating material reception amount m per unit time reaches the set upper limit value M in a reception hopper 14 in the filter apparatuses 5A and 5B, the above-described circulated powder refreshing treatment is executed.

In other words, with the circulated powder refreshing treatment, the powder P that has accumulated at that time in the reception hopper 14 and the powder P that is contained at that time in the corresponding powder tank 16 is collected in the relay tank 23, and the powder P stored in the supply tank 25 is supplied to the powder tank 16 in which the powder has been collected.

(c) Separation Step

In the separation step, the coating material-containing powder P that is stored in the relay tank 23 is separated in the separation portion 31 into powder to be discarded and powder to be recycled at a set separation ratio K1:K2 (e.g., 10%:90%), which is set in advance in a fixed manner.

Note that a weight ratio, a volume ratio, or a bulk ratio in the relay tank 23 is used as the set separation ratio K1:K2.

(d) Discarding Step

In the discarding step, the powder P to be discarded that was separated in the above-described separation step (i.e., the K1% of the coating material-containing powder P that is stored in the relay tank 23) is moved to the discarding tank 28.

(e) Recycling Step

In the recycling step, the powder P to be recycled that was separated in the above-described separation step (i.e., the K2% of the coating material-containing powder P stored in the relay tank 23) is subjected to the recycling treatment by the recycling treatment portion 30.

(f) Powder Refreshing Step

In the powder refreshing step, separately from the above-described circulated powder refreshing treatment performed for each parallel exhaust treatment airway fs of the filter apparatuses 5A and 5B, the powder P subjected to the recycling treatment in the above-described recycling step is returned to the supply tank 25, and fresh powder P of the an amount that is the same as that of the powder P (i.e., the K1% of the coating material-containing powder P) discarded in the above-described discarding step is supplied from the fresh powder tank 27 to the supply tank 25.

Note that the needed treatment in steps a to f, such as the separation treatment for the powder P in the separation step and the supply treatment for the fresh powder P in the powder refreshing treatment, is automatically carried out by the control apparatus C.

Fourth Embodiment

Figure 10:
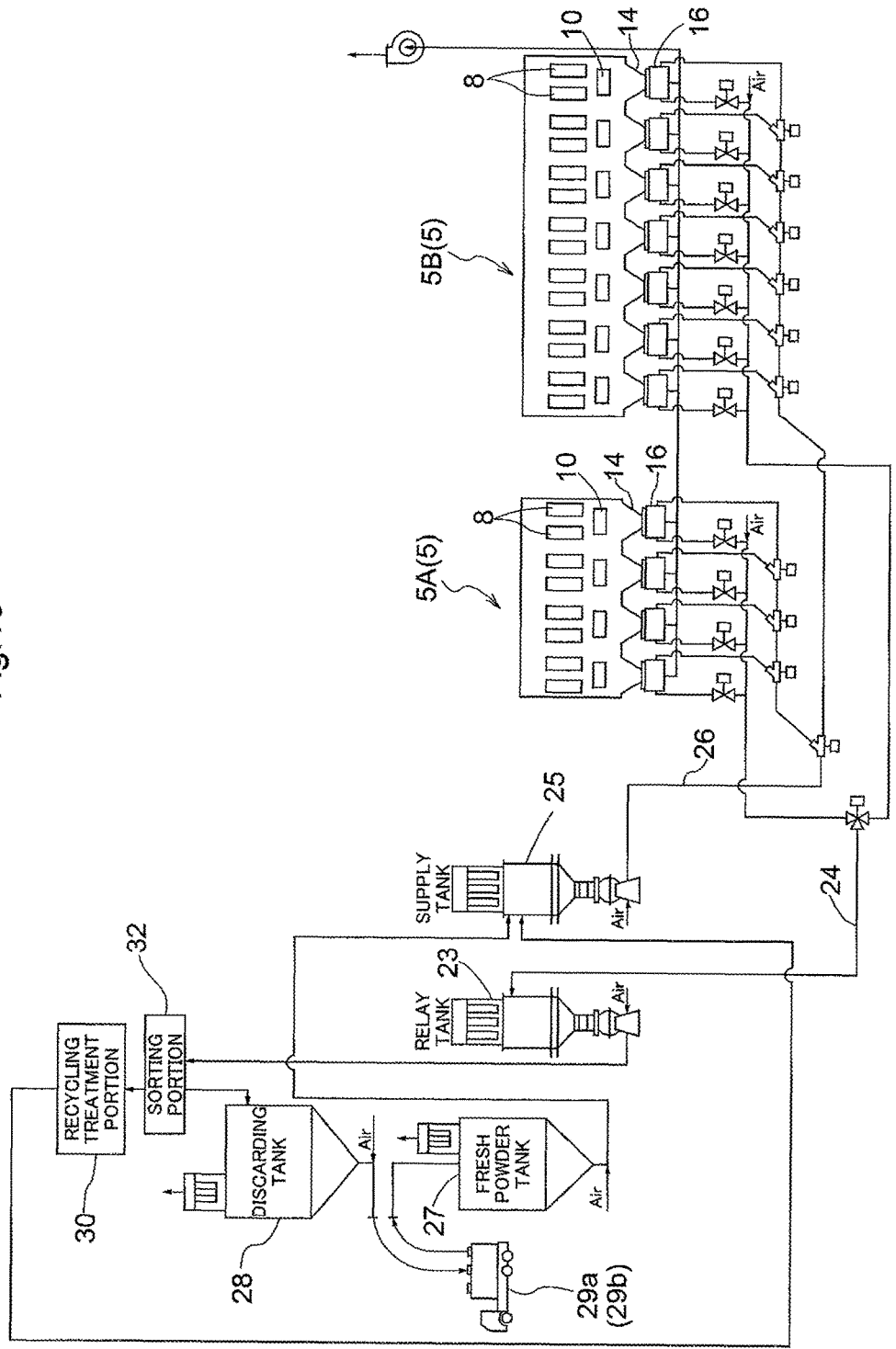
FIG. 10 is a system configuration diagram showing a coating exhaust treatment system according to a fourth embodiment.

FIG. 10 shows an overall configuration of a coating exhaust treatment system according to a fourth embodiment.

In the coating exhaust treatment system, similarly to the first to third embodiments, reference numerals 5A and 5B denote filter apparatuses 5 that are equipped in the two coating step portions in the coating booth 1.

The two filter apparatuses 5A and 5B each include the above-described parallel exhaust treatment airways fs.

Also, in each of the exhaust treatment airways fs, the overspray coating included in the discharged air from the coating chamber 2 is collected in a state of circulating the powder P through the powder nozzles 11→the filters 8→the reception hoppers 14→the powder tanks 16→the powder supply paths 21, in the stated order.

Reference numeral 25 denotes a supply tank that supplies the powder P to the multiple powder tanks 16 of the two filter apparatuses 5A and 5B through the powder supply paths 26.

Reference numeral 23 indicates a relay tank in which the coating material-containing powder P is collected through the powder discharge paths 24 from the multiple powder tanks 16 in the two filter apparatuses 5A and 5B.

Also, reference numeral 27 indicates a fresh powder tank that stores fresh powder P, and reference numeral 28 indicates a discarding tank that stores used powder P to be discarded.

The fresh powder P brought in by a transport vehicle 29a is stored in the fresh powder tank 27.

On the other hand, the used powder P stored in the discarding tank 28 is taken out by a transport vehicle 29b and discarded.

Reference numeral 32 denotes a sorting portion that sorts the coating material-containing powder P in the relay tank 23 into unsuitable powder to be discarded and suitable powder to be recycled.

The unsuitable coating material-containing powder P that was sorted by the sorting portion 32 (the coating material-containing powder that is difficult to subject to the recycling treatment) is moved to the discarding tank 28 and discarded.

On the other hand, the suitable coating material-containing powder P that was sorted in the sorting portion 32 (i.e., the coating material-containing powder that is relatively easy to subject to the recycling treatment) is sent to the recycling treatment portion 30 and subjected to the recycling treatment.

Specifically, in the sorting portion 32, a sieve treatment is carried out to sort the coating material-containing powder P in the relay tank 23 into large-grain powder P that contains a lot of the coating material and has a particle diameter that is at least a set particle diameter ds, and small-grain powder P that contains little of the coating material and has a particle diameter that is less than the set particle diameter ds.

The large-grain powder P sorted in the sieve treatment is sent to the discarding tank 28 as unsuitable powder.

On the other hand, the small-grain powder P sorted in the sieve treatment is sent to the recycling treatment portion 30 as suitable powder.

Figure 11:
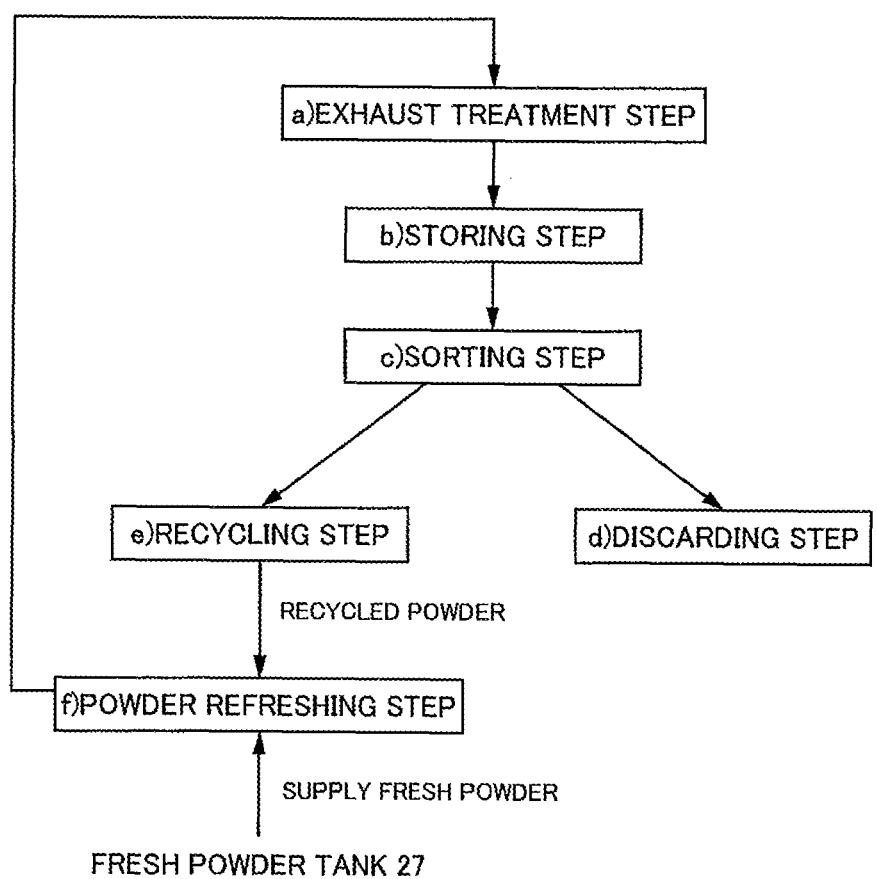
FIG. 11 is a flowchart showing an operation pattern of the coating exhaust treatment system according to the fourth embodiment.

With the coating exhaust treatment system of the fourth embodiment, as shown in FIG. 11, each of the following steps a to f are carried out repeatedly.

(a) Exhaust Treatment Step

In the exhaust treatment step, in each parallel exhaust treatment airway fs in the filter apparatuses 5A and 5B, the powder P supplied from the supply tank 25 (i.e., the powder P supplied from the supply tank 25 to the powder tank 16 in the filter apparatuses 5A and 5B) is dispersed in the discharged air EA from the coating chamber 2 by the powder nozzles 11 serving as the powder dispersal means, and the discharged air EA is passed through the filters 8 in the filter apparatuses 5A and 5B.

(b) Storing Step

In the storing step, the coating material-containing powder P that was removed from the filters 8 of the filter apparatuses 5A and 5B through the filter cleaning treatment in the exhaust treatment step is stored in the relay tank 23.

Specifically, in the first exhaust treatment step, when the integrated value Σm of the coating material reception amount m per unit time reaches the set upper limit value M in a reception hopper 14 in the filter apparatuses 5A and 5B, the above-described circulated powder refreshing treatment is executed.

In other words, with the circulated powder refreshing treatment, the powder P that has accumulated at that time in the reception hopper 14 and the powder P that is contained at that time in the corresponding powder tank 16 is collected in the relay tank 23, and the powder P stored in the supply tank 25 is supplied to the powder tank 16 after the powder is collected.

(c) Sorting Step

In the sorting step, the coating material-containing powder P that is stored in the relay tank 23 is sorted in the sorting portion 32 into large-grain powder to be discarded and small-grain powder to be recycled through the above-described sieve treatment.

(d) Discarding Step

In the discarding step, the large-grain powder P to be discarded (i.e., the coating material-containing powder P with a particle diameter of the set particle diameter ds or more) that was sorted in the above-described sorting step is moved to the discarding tank 28.

(e) Recycling Step

In the recycling step, the small-grain powder P to be recycled (i.e., the coating material-containing powder P with a particle diameter of less than the set particle diameter ds) that was sorted in the above-described sorting step is subjected to the recycling treatment in the recycling treatment portion 30.

(f) Powder Refreshing Step

In the powder refreshing step, separate from the above-described circulated powder refreshing treatment performed for each parallel exhaust treatment airway fs of the filter apparatuses 5A and 5B, the powder P subjected to the recycling treatment in the above-described recycling step is returned to the supply tank 25, and fresh powder P of an amount that is the same as the powder P that was discarded in the above-described discarding step is supplied from the fresh powder tank 27 to the supply tank 25.

Note that the needed treatment in steps a to f, such as the sorting treatment for the powder P in the sorting step and the supply treatment for the fresh powder P in the powder refreshing step, is automatically carried out by the control apparatus C.

Also, in the sorting portion 32, the coating material-containing powder P in the relay tank 23 may be sorted, instead of through the sieve treatment, through wind-powered sorting or the like into unsuitable powder to be discarded, which has a large coating material portion and has a specific surface area of less than a set value, and suitable powder to be recycled, which has a small coating material portion and has a specific surface area of a set value or more.

Also, the wind-powered sorting and the above-described sieve sorting may be carried out in combination.

The sorting method and sorting reference to be used in the sorting portion 32 need only be selected as appropriate based on experimental results and the like.

Fifth Embodiment

Figure 12:
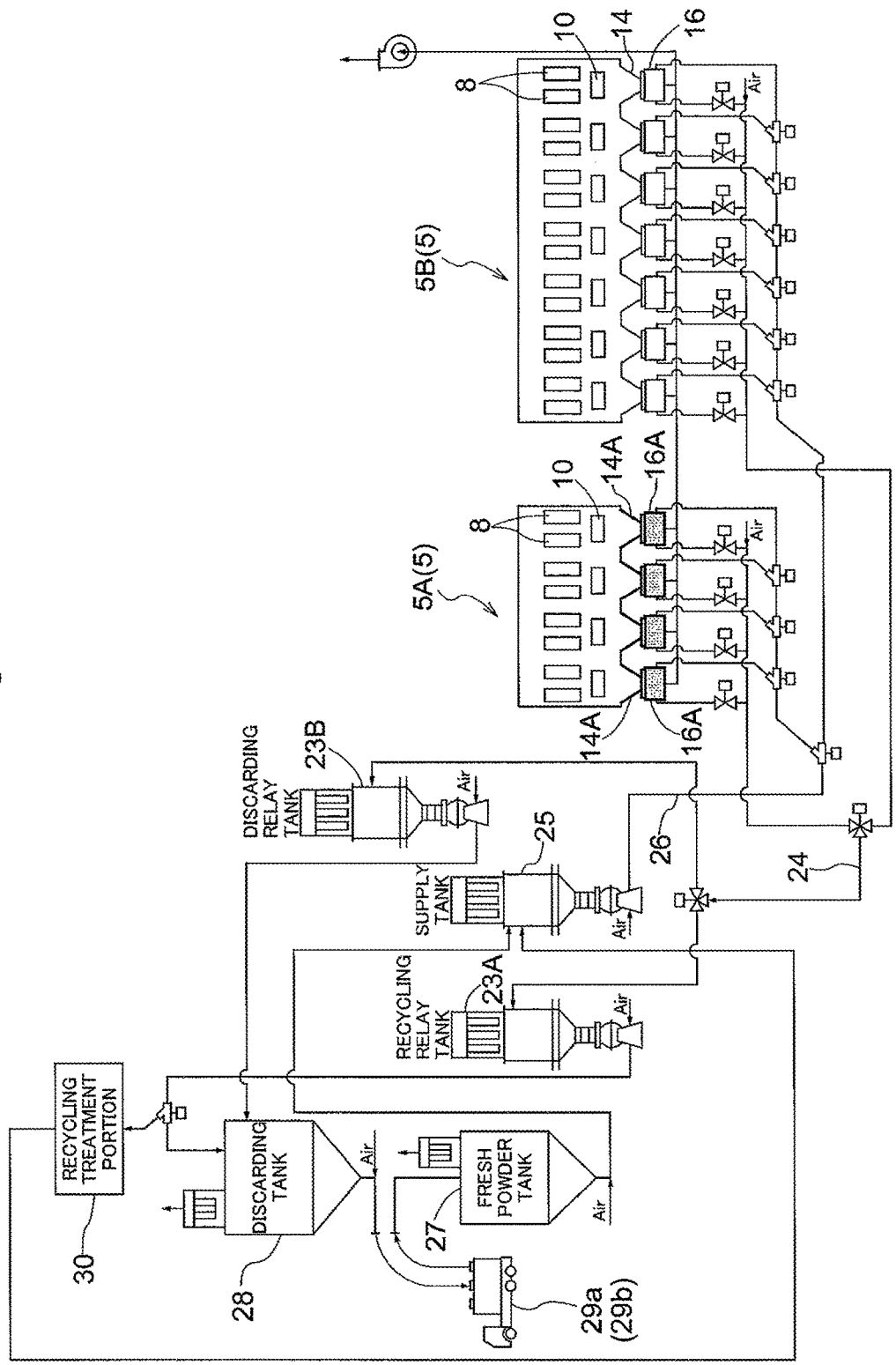
FIG. 12 is a system configuration diagram showing a coating exhaust treatment system according to a fifth embodiment.

FIG. 12 shows an overall configuration of a coating exhaust treatment system according to a fifth embodiment.

In the coating exhaust treatment system, similarly to the first to fourth embodiments, reference numerals 5A and 5B denote the filter apparatuses 5 that are equipped in the two coating step portions in the coating booth 1.

The two filter apparatuses 5A and 5B each include the above-described parallel exhaust treatment airways fs.

Also, in each of the exhaust treatment airways fs, the overspray coating included in the discharged air from the coating chamber 2 is collected in a state of circulating the powder P through the powder nozzles 11→the filters 8→the reception hoppers 14→the powder tanks 16→the powder supply paths 21 in the stated order.

Reference numeral 25 denotes a supply tank that supplies the powder P to the multiple powder tanks 16 of the two filter apparatuses 5A and 5B through the powder supply paths 26.

Also, reference numeral 27 indicates a fresh powder tank that stores fresh powder P, and reference numeral 28 indicates a discarding tank that stores used powder P to be discarded.

The fresh powder P brought in by the transport vehicle 29a is stored in the fresh powder tank 27.

On the other hand, the used powder P stored in the discarding tank 28 is taken out by a transport vehicle 29b and discarded.

Also, with the coating exhaust treatment system of the fifth embodiment, a recycling relay tank 23A and a discarding relay tank 23B are provided as relay tanks for collecting the coating material-containing powder P from the multiple powder tanks 16 in the two filter apparatuses 5A and 5B through the powder discharge paths 24.

In other words, the multiple powder tanks 16 in the two filter apparatuses 5A and 5B are containers that separate and contain the coating material-containing powder P removed from the filters 8 through the filter cleaning treatment for each parallel exhaust treatment pathway fs (in other words, for each location at which the discharged air EA is generated), and therefore the proportion of the coating material portion of the stored coating material-containing powder P differs in each powder tank 16.

In contrast to this, regarding the specific powder tank 16A in which the coating material-containing powder P that has a high proportion of the coating material portion is stably contained among the powder tanks 16, the coating material-containing powder P having a high coating material portion proportion contained in the specific powder tank 16A is collected in the discarding relay tank 23B through the powder discharge paths 24.

On the other hand, the coating material-containing powder P that has a relatively small proportion of the coating material portion and is contained in the other powder tanks 16 is collected in the recycling relay tank 23A through the powder discharge paths 24.

Figure 13:
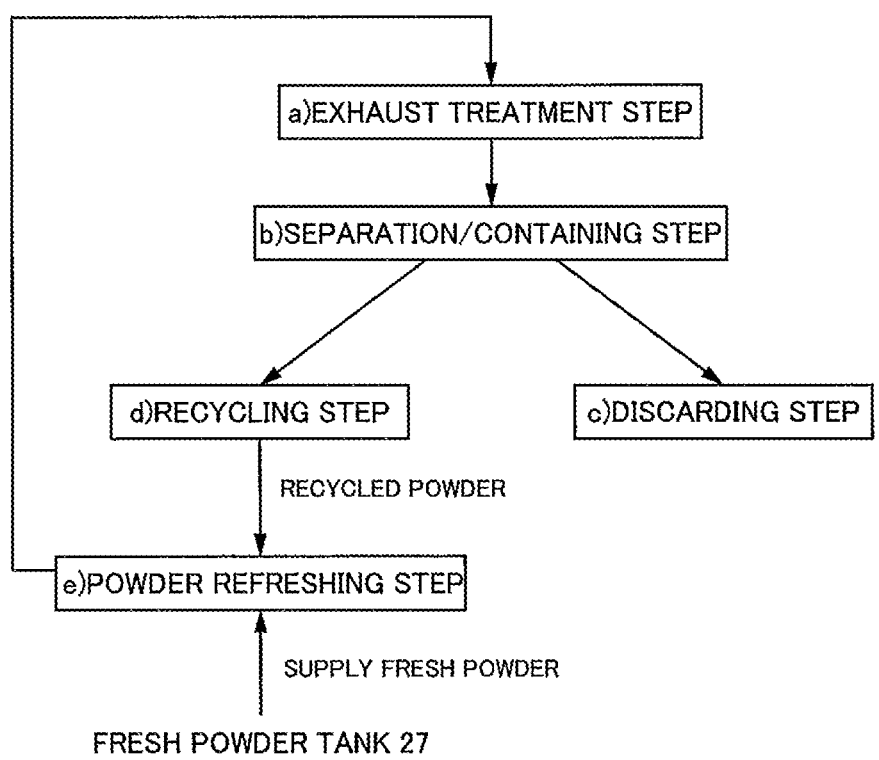
FIG. 13 is a flowchart showing an operation pattern of the coating exhaust treatment system according to the fifth embodiment.

With the coating exhaust treatment system of the fifth embodiment, as shown in FIG. 13, each of the following steps a to e are carried out repeatedly.

(a) Exhaust Treatment Step

In the exhaust treatment step, in each parallel exhaust treatment airway fs in the filter apparatuses 5A and 5B, the powder P supplied from the supply tank 25 (i.e., the powder P supplied from the supply tank 25 to the powder tank 16 in the filter apparatuses 5A and 5B) is dispersed in the discharged air EA from the coating chamber 2 by the powder nozzles 11 serving as the powder dispersal means, and the discharged air EA is passed through the filters 8 in the filter apparatuses 5A and 5B.

(b) Separation/containing Step

In the separation/containing step, the coating material-containing powder P removed from the filters 8 in the filter apparatuses 5A and 5B through the filter cleaning treatment in the exhaust treatment step is stored in mutually different powder tanks 16 in a state of being separated by each location at which the discharged air EA is generated.

(c) Discarding Step

In the discarding step, the coating material-containing powder P that has a high proportion of the coating material portion and is contained in the specific powder tank 16A is stored in the discarding relay tank 23B in the above-described separation/containing step.

Specifically, in the above-described exhaust treatment step, in the specific reception hopper 14A corresponding to the specific powder tank 16A among the multiple reception hoppers 16 in the filter apparatuses 5A and 5B, when the integrated value Σm of the coating material reception amount m per unit time reaches the set upper limit value M, the above-described circulated powder refreshing treatment is executed for the specific reception hopper 14A.

In other words, the powder P that has accumulated at that time in the specific reception hopper 14A and the powder P that is contained at that time in the corresponding specific reception hopper 16A are collected in the discarding relay tank 23B and the powder P stored in the supply tank 25 is supplied to the specific powder tank 16A after the powder is collected.

Also, in the discarding step, thereafter, the coating material-containing powder P in the discarding relay tank 23B is moved to the discarding tank 28 and discarded.

(d) Recycling Step

In the recycling step, the coating material-containing powder P that has a low proportion of the coating material portion and is contained in the powder tank 16 other than the specific powder tank 16A in the separation/containing step is collected in the recycling relay tank 23A.

Specifically, in the above-described exhaust treatment step, in the reception hopper 14 corresponding to the powder tank 16 other than the specific powder tank 16A among the multiple reception hoppers 16 in the filter apparatuses 5A and 5B, when the integrated value Σm of the coating material reception amount m per unit time reaches the set upper limit value M, the above-described circulated powder refreshing treatment is executed on the reception hopper 14.

In other words, the powder P that has accumulated at that time in the reception hopper 14 and the powder P that is contained at that time in the corresponding powder tank 16 is collected in the recycling relay tank 23A, and the powder P stored in the supply tank 25 is supplied to the powder tank 16 in which the powder has been collected.

Also, in the recycling step, thereafter, the coating material-containing powder P in the recycling relay tank 23A is sent to the recycling treatment portion 30 and is subjected to the recycling treatment.

(e) Powder Refreshing Step With the powder refreshing step, the powder P subjected to the recycling treatment in the recycling step is returned to the supply tank 25 and the fresh powder P of an amount that is the same as that of the powder P that was discarded in the discarding step is supplied from the fresh powder tank 27 to the supply tank 25.

Note that the needed processes in steps a to e, such as the powder treatment in the discarding step and the recycling step and the supply treatment of the fresh powder P in the powder refreshing step are executed automatically by the control apparatus C.

The coating exhaust treatment system according to the first to fifth embodiments are as described above, and next, first to fourth examples of the recycling treatment portion 30 will be described.

Note that with the coating exhaust treatment system according to the first to fifth embodiments, one of the recycling treatment portions 30 according to the first example to the fourth example may be employed.

Figure 14:
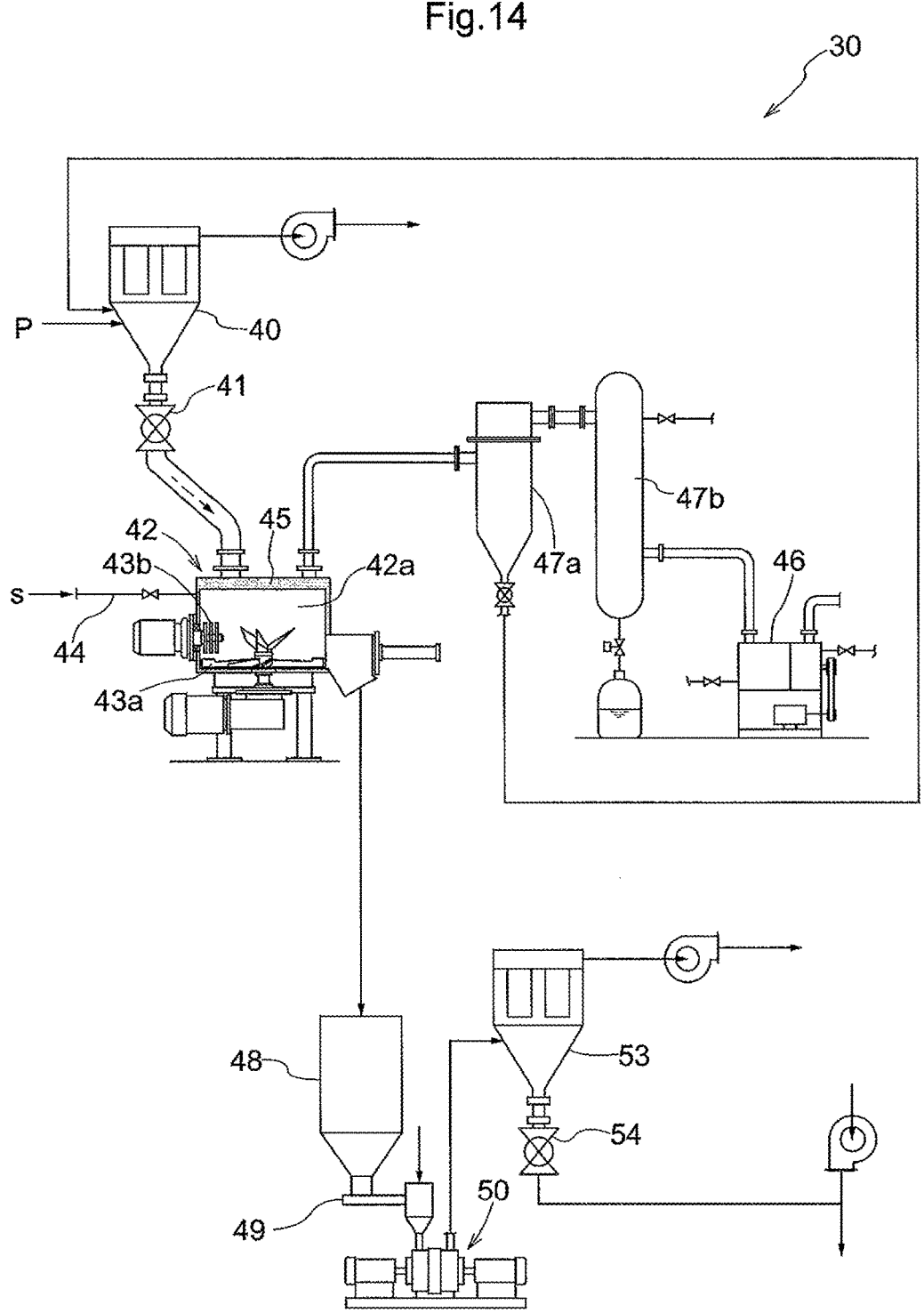
FIG. 14 is an apparatus configuration diagram showing a first example of the recycling treatment portion.

FIG. 14 shows a first example of the recycling treatment portion 30.

With the recycling treatment portion 30 of the first example, the coating material-containing powder P that is to be recycled and was conveyed from the above-described relay tank 23, the separation portion 31, the sorting portion 32, or the recycling relay tank 23A along with the carrier air is received by a first bag filter apparatus 40.

Also, the received coating material-containing powder P is introduced to the recycling chamber 42a in the recycler 42 by a predetermined amount by a valve apparatus 41 such as a rotary valve.

A stirring rotary blade 43a that stirs the coating material-containing powder P contained in the recycling chamber 42a using low-speed rotation (e.g., 80 to 200 rpm) and a shredding rotary blade 43b that shreds the coating material-containing powder P contained in the recycling chamber 42a using high-speed rotation are equipped in the recycling chamber 42a.

That is, with the recycling chamber 42a hermetically sealed, the coating material-containing powder P in the recycling chamber 42a is subjected to pulverization treatment by rotating the rotary blades 43a and 43b.

Also, a steam heater 45 that heats the coating material-containing powder P in the recycling chamber 42a using the chamber wall of the recycling chamber 42a as a heat transfer wall by supplying steam s to the heater inner portion through a steam path 44 is equipped in the circumferential wall portion of the recycler 42.

In other words, with the recycler 42, at the same time as the rotary blades 43a and 43b perform the pulverization treatment for the coating material-containing powder P, heating treatment for causing a crosslinking reaction and hardening the coating material portion in the coating material-containing powder P in the recycling chamber 42a through heating performed by the steam heater 45.

Furthermore, with the pulverization treatment and the heating treatment, drying treatment for separating the liquid portion such as the solvent included in the coating material from the coating material portion in the coating material-containing powder P is also performed at the same time by reducing the pressure of the recycling chamber 42a using a vacuum pump 46.

Reference numeral 47a denotes a bag filter that collects pulverization refuse included in the air suctioned from the recycling chamber 42a by the vacuum pump 46.

Reference numeral 47b denotes a condenser for condensing and collecting the steam (i.e., the liquid portion separated from the coating material portion) of the solvent or the like included in the air suctioned from the recycling chamber 42a by the vacuum pump 46.

Note that the condenser 47b may be omitted, or the bag filter 47a may be directly connected to the vacuum pump 46.

The powder P (i.e., the pulverized mixture of the powder and the hardened coating material) resulting from the pulverization treatment and the heating treatment performed by the recycler 42 is received in a sub-tank 48 and is thereafter introduced into the airflow fine powder production machine 50 from the sub-tank 48 by a feeder 49 and subjected to fine pulverization treatment.

Figure 15:
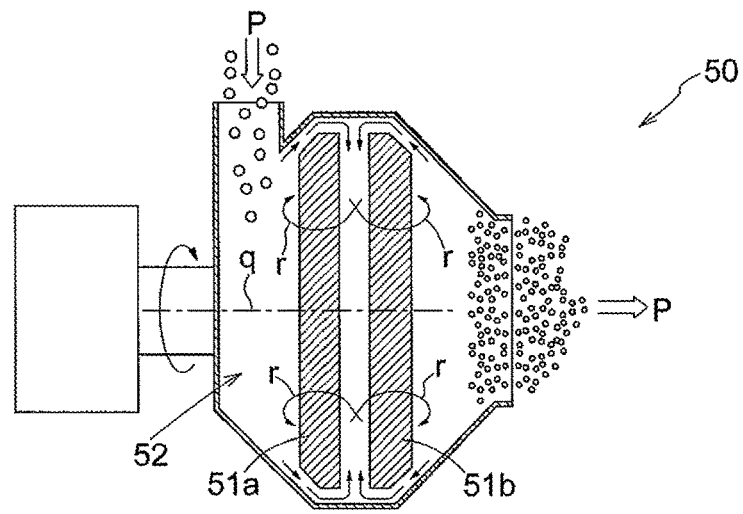
FIG. 15 is a schematic view showing an inner configuration of an airflow fine particle production machine.

With the airflow fine powder production machine 50, as shown in FIG. 15, two bladed wheels 51a and 51b that are brought close to each other with matching rotational axes q are rotated at a high speed in the same direction or in mutually opposite directions in the treatment chamber 52, and thereby the pulverized mixture of the powder and the hardened coating material is made to collide with the bladed wheels 51a and 51b and the pulverized mixture of the powder and the hardened coating material is made to collide with itself in the high-speed turning airflow r that occurs due to the high-speed rotation of the bladed wheels 51a and 51b.

Then, the pulverized mixture of the powder and the hardened coating material is finely pulverized through these collisions.

Due to the fine pulverization treatment performed by the airflow fine powder production machine 50, the average particle diameter of the powder P (pulverized mixture of the powder and the hardened coating material) is adjusted to approximately the average particle diameter (10 μm) of the fresh powder P, and the recycling treatment for the coating material-containing powder P is completed.

The powder P resulting from the recycling treatment, which was subjected to fine pulverization treatment by the airflow fine powder production machine 50 is taken out to the second bag filter apparatus 53 along with the carrier air and is sent to a predetermined supply destination via a valve apparatus 54 such as a rotary valve from the second bag filter apparatus 53.

Figure 16:
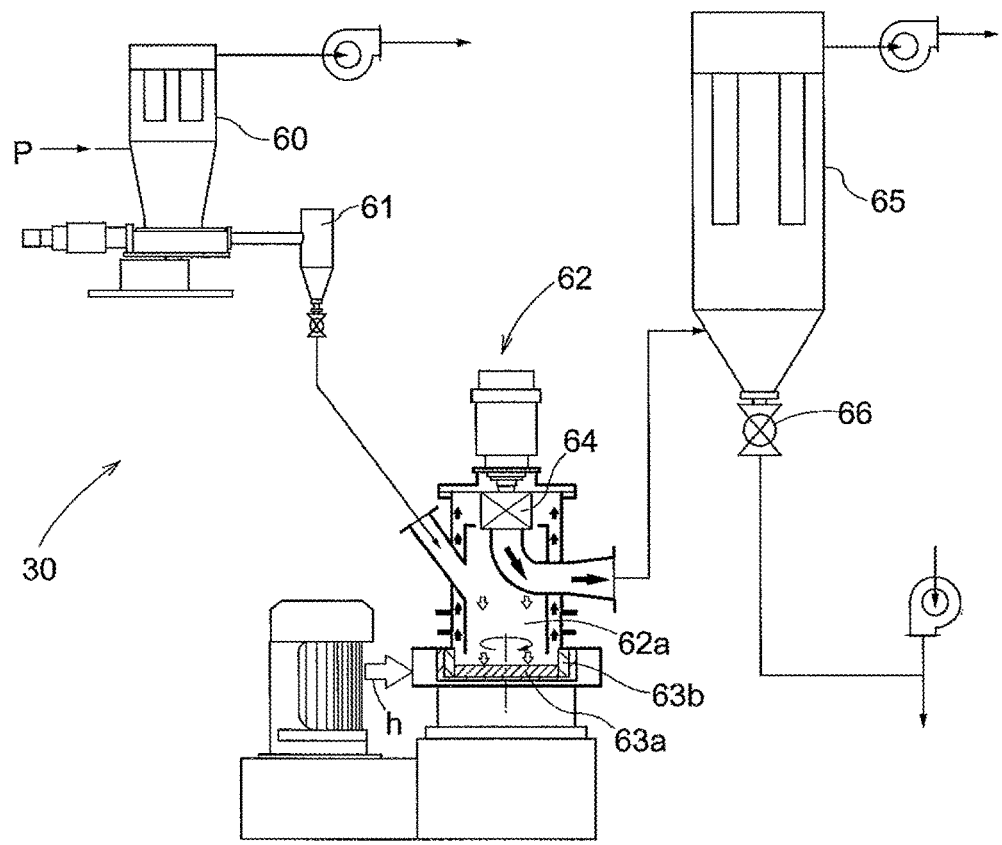
FIG. 16 is an apparatus configuration diagram showing a second example of the recycling treatment portion.

Note that if powder that is similar to the fresh powder P to a certain degree can be obtained using only the pulverization treatment and the heating treatment in the recycler 42, the fine pulverization treatment performed by the airflow fine powder production machine 50 may be omitted. FIG. 16 shows a second example of the recycling treatment portion 30.

With the recycling treatment portion 30 of the second example, the coating material-containing powder P that is to be recycled and was conveyed from the above-described relay tank 23, the separation portion 31, the sorting portion 32, or the recycling relay tank 23A along with the carrier air is received by a first bag filter apparatus 60.

Also, the received coating material-containing powder P is continuously introduced into the recycling chamber 62a in the recycler 62 at a constant flow rate by the feeder 61.

A rotary striker 63a and a fixed collider 63b are equipped in the recycling chamber 62a.

In other words, by rotating the rotary striker 63a at a high speed, the coating material-containing powder P introduced into the recycling chamber 62a is made to collide with the rotary striker 63a and is made to collide with the fixed collider 63b.

Through these collisions, the coating material-containing powder P in the recycling chamber 62a is subjected to pulverization treatment.

Also, at the same time as the pulverization treatment, by blowing hot air h into the recycling chamber 62a, the heating treatment for causing a crosslinking reaction and hardening the coating material portion in the coating material-containing powder P and the drying treatment for separating the liquid portion such as the solvent included in the coating material portion from the coating material portion in the coating material-containing powder P are carried out on the coating material-containing powder P in the recycling chamber 62a.

Furthermore, a classifier 64 is equipped in the recycler 62.

In other words, with the classifier 64, only the powder P that has been subjected to the pulverization treatment and the heating treatment in the recycling chamber 62a and has a particle diameter that is approximately the average particle diameter of the fresh powder P is dispensed from the recycling chamber 62a as the powder P resulting from the recycling treatment.

Also, the powder P resulting from the recycling treatment, which was dispensed from the recycler 62 is taken out to the second bag filter apparatus 65 along with the carrier air and is sent to a predetermined supply destination via a valve apparatus 66 such as a rotary valve from the second bag filter apparatus 65.

Figure 17:
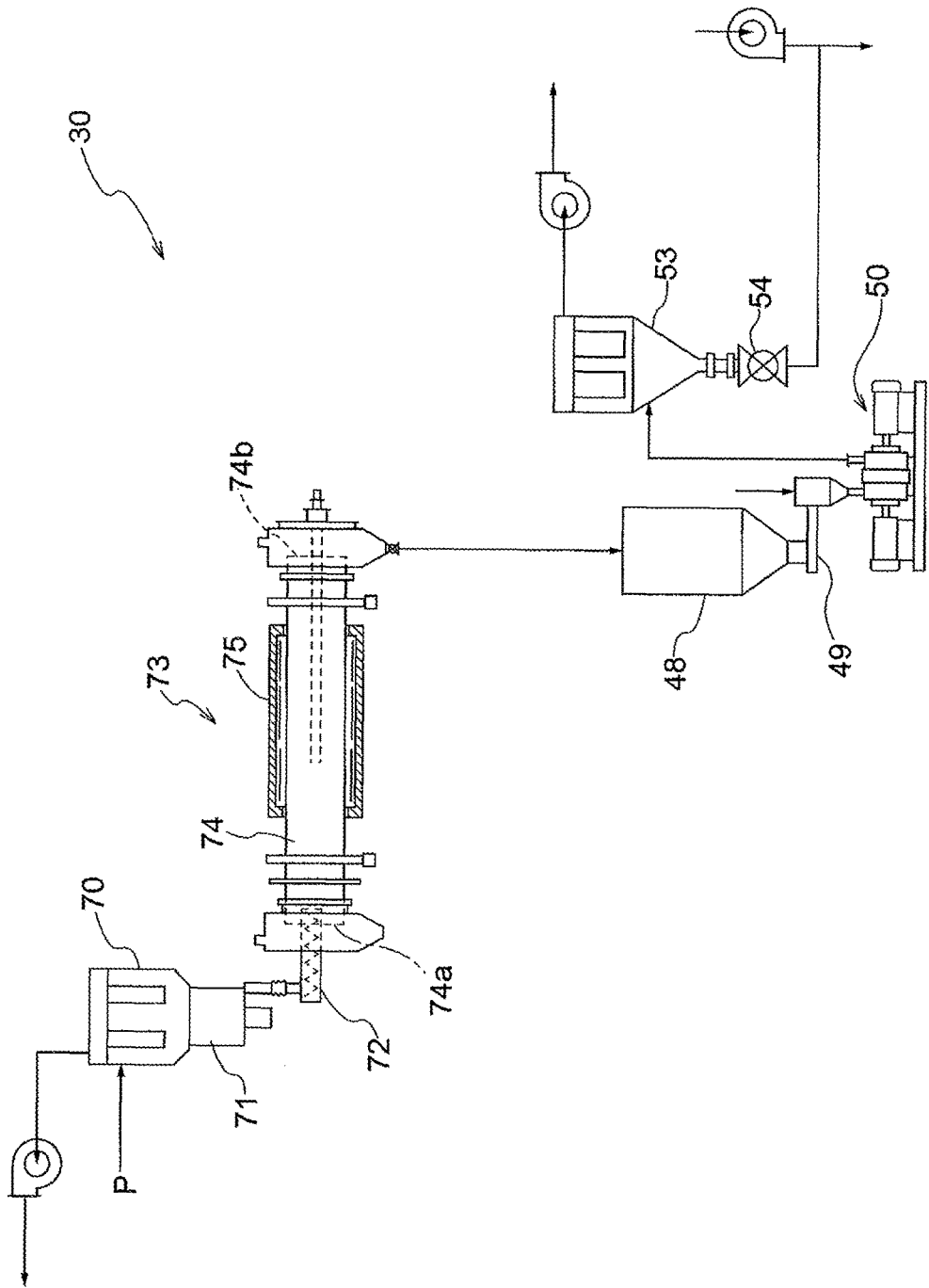
FIG. 17 is an apparatus configuration diagram showing a third example of the recycling treatment portion.

FIG. 17 shows a third example of the recycling treatment portion 30.

With the recycling treatment portion 30 of the third example, the coating material-containing powder P that is to be recycled and was conveyed from the above-described relay tank 23, the separation portion 31, the sorting portion 32, or the recycling relay tank 23A along with the carrier air is received by a first bag filter apparatus 70.

Also, the received coating material-containing powder P is introduced into the entrance end 74a of the rotary tube 74, which is a furnace body of a rotary kiln 73, at a constant flow rate by the feeder 71 and a screw conveyor 72.

The introduced coating material-containing powder P is moved inside of the rotary tube 74 toward the exit end 74b of the rotary tube 74 while being stirred accompanying the rotation of the rotary tube 74.

A heater 75 that heats the coating material-containing powder P in the rotary tube 74 using electricity, gas, or heavy oil in a state in which the tube wall of the rotary tube 74 is used as a heat transfer wall is equipped in the circumferential portion of the rotary tube 74.

In other words, the coating material-containing powder P in the rotary tube 74 is heated at a temperature (e.g., 400° C. to 500° C.) that does not cause thermal decomposition of the powder component (e.g., calcium carbonate) by the heater 75, and thereby thermal decomposition treatment for thermally decomposing the coating material portion in the coating material-containing powder P in the rotary tube 74 is carried out on the coating material-containing powder P in the rotary tube 74.

The coating material-containing powder P (i.e., the powder P with the thermally-decomposed coating material portion) resulting from the thermal decomposition treatment that is dispensed from the exit end 74b of the rotary tube 74 is received in the sub-tank 48, similarly to the recycling treatment portion of the first example, and thereafter, is introduced into the above-described airflow fine powder production machine 50 (see FIG. 15) from the sub-tank 48 by the feeder 49 and is subjected to fine pulverization treatment.

Also, the powder P resulting from the recycling treatment, which has an average particle diameter that is adjusted to about the average particle diameter (10 μm) of the fresh powder P through the fine pulverization treatment performed by the airflow fine powder production machine 50, is taken out to the second bag filter apparatus 53 along with the carrier air, and is sent to a predetermined supply destination via the valve apparatus 54 such as a rotary valve from the second bag filter apparatus 53.

Note that if powder that is similar to the fresh powder P to a certain degree can be obtained using only the thermal decomposition treatment in the recycler 73, the fine pulverization treatment performed by the airflow fine powder production machine 50 may be omitted.

Figure 18:
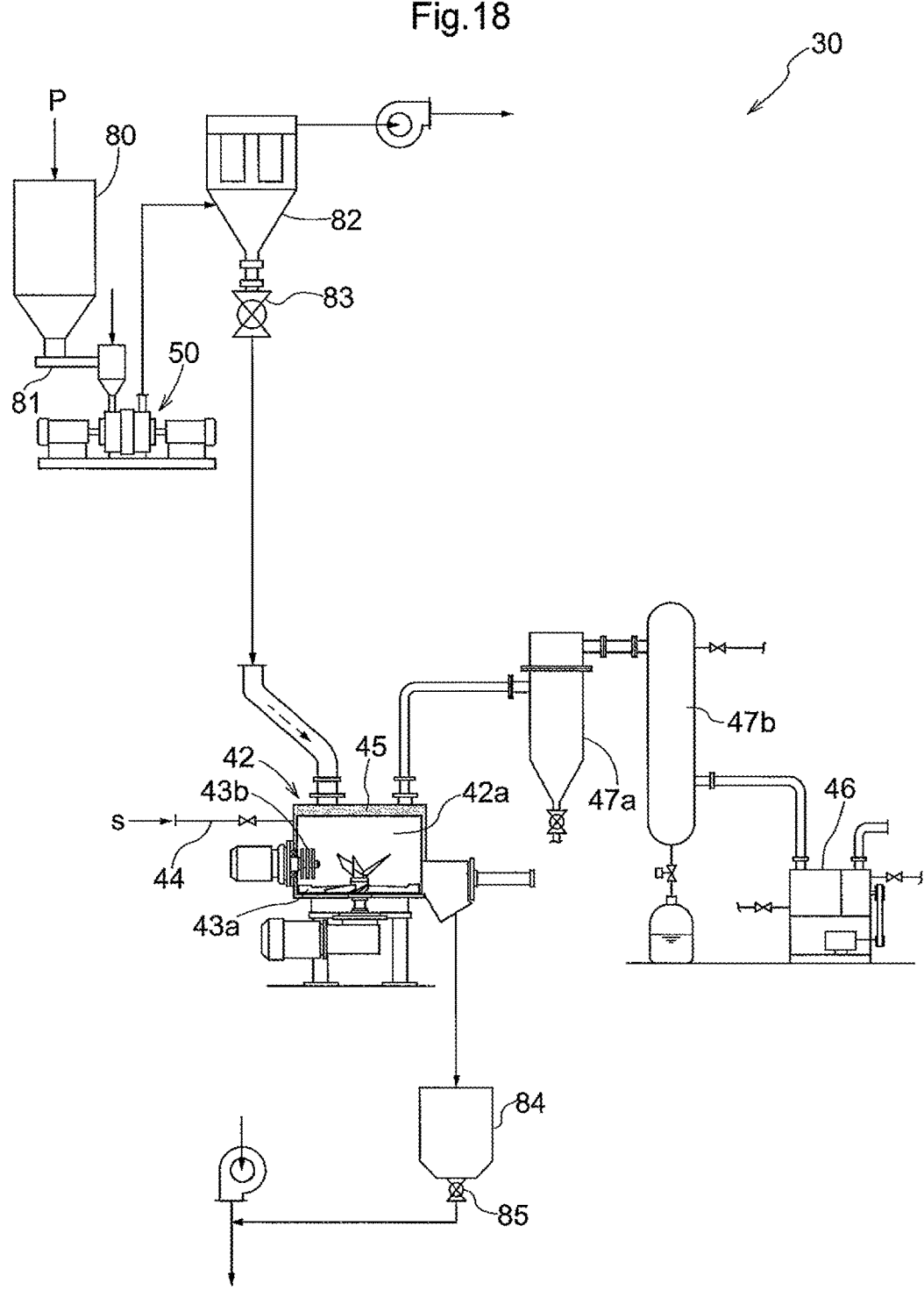
FIG. 18 is an apparatus configuration diagram showing a fourth example of the recycling treatment portion.

FIG. 18 shows a fourth example of the recycling treatment portion 30.

With the recycling treatment portion 30 of the fourth example, the coating material-containing powder P that is to be recycled and was conveyed from the above-described relay tank 23, the separation portion 31, the sorting portion 32, or the recycling relay tank 23A along with the carrier air is received by a first sub-tank 80.

Also, the received coating material-containing powder P is introduced into the above-described airflow fine powder production machine 50 (see FIG. 15) at a predetermined flow rate by the feeder 81 and is subjected to the fine pulverization treatment.

The coating material-containing powder P that has an average particle diameter that has been adjusted to about the average particle diameter (10 μm) of the fresh powder P through the fine pulverization treatment performed by the airflow fine powder production machine 50 is received in the first bag filter apparatus 82 and is introduced from the first bag filter apparatus 82 to the recycling chamber 42a of the recycler 42 in predetermined amounts by the valve apparatus 83 such as a rotary valve.

The recycler 42 is the same as that shown in FIG. 14, and performs heating treatment for causing a crosslinking reaction and hardening the coating material portion in the coating material-containing powder P resulting from the fine pulverization treatment by heating performed by the steam heater 45 provided in the circumferential wall portion of the recycler 42 while the coating material-containing powder P resulting from the fine pulverization treatment introduced into the recycler 42a is subjected to the fine pulverization treatment (here, substantially a stirring treatment) through rotation of the stirring rotary blade 43a and the shredding rotary blade 43b.

Also, with the heating treatment, drying treatment for separating the liquid portion such as the solvent included in the coating material from the coating material portion in the coating material-containing powder P resulting from the fine pulverization treatment is also performed at the same time by reducing the pressure of the recycling chamber 42a using a vacuum pump 46.

The powder P resulting from the recycling treatment (i.e., the finely pulverized mixture of the powder and the hardened coating material) that was subjected to the heating treatment by the recycler 42 is received in the second sub-tank 84 and is sent to a predetermined supply destination via the valve apparatus 85 such as the rotary valve from the second sub-tank 84.

Note that if powder similar to the fresh powder P to a certain degree can be obtained through only the fine pulverization treatment in the airflow fine powder production machine 50, the heating treatment and the drying treatment in the recycler 42 may be omitted.

Also, in this example as well, the condenser 47b may be omitted, and the bag filter 47a may be directly connected to the vacuum pump 46.

Although a coating exhaust treatment system for treating discharged air EA discharged from the coating chamber 2 of the coating booth 1 that spray-coats an automobile body was described above, the operation method for the coating exhaust treatment system according to the present invention is not limited to an automobile body and can be applied to coating equipment that spray-coats any kind of coating object W.

INDUSTRIAL APPLICABILITY

The operation method for the coating exhaust treatment system according to the present invention can be used in various types of coating equipment in various types of fields.

DESCRIPTION OF REFERENCE SIGNS

W Coating object
2 Coating chamber
EA Discharged air
8 Filter
P Powder
11 Powder nozzle (powder dispersal means)
25A First supply tank
23 Relay tank
30 Recycling treatment portion
25B Second supply tank
n1 Number of repetitions of first operation
ns Set number
n2 Number of repetitions of second operation
25 Supply tank
K1:K2 Set separation ratio
16 Powder tank (powder container)
16A Specific powder tank (specific powder container)
42a Recycling chamber
43a, 43b Rotary blade
45 Heater
62a Recycling chamber
63a Rotary striker
63b Fixed collider
h Hot air
74 Rotary tube
73 Rotary kiln
q Rotational axis
51a, 51b Bladed wheel
52 Treatment chamber
50 Airflow fine powder production machine
14 Reception hopper
17 Partitioning door (opening/closing valve)
m Coating material reception amount per unit time
M Set upper limit value

The invention claimed is:

1. An operation method for a coating exhaust treatment system including
a filter configured to filter discharged air discharged from a coating chamber in which a coating object is spray-coated and collect overspray coating material included in the discharged air, and
a powder dispersal means configured to disperse powder for forming a filter covering layer in the discharged air and form a filter covering layer made of a layer of the accumulated powder on a surface on the filter as the discharged air passes through the filter,
the method comprising:
in a first operation,
carrying out a first exhaust treatment step of dispersing the powder stored in a first supply tank in the discharged air using the powder dispersal means and causing the discharged air to pass through the filter, and
carrying out a first recycling step of recycling the coating material-containing powder in a relay tank using a recycling treatment portion and storing the recycled powder in a second supply tank and
a first storing step of storing the coating material-containing powder that was removed from the filter through filter cleaning treatment in the first exhaust treatment step in the relay tank after sending the coating material-containing powder in the relay tank to the recycling treatment portion in the first recycling step; and
in a second operation,
carrying out a second exhaust treatment step of dispersing the powder stored in the second supply tank in the discharged air using the powder dispersal means and causing the discharged air to pass through the filter, and
carrying out a second recycling step of recycling the coating material-containing powder in the relay tank using the recycling treatment portion and storing the recycled powder in the first supply tank and
a second storing step of storing the coating material-containing powder that was removed from the filter through filter cleaning treatment in the second exhaust treatment step in the relay tank after sending the coating material-containing powder in the relay tank to the recycling treatment portion in the second recycling step;
the method further comprising:
when the number of repetitions of the first operation reaches a set number while the first operation and the second operation are repeatedly being carried out alternatingly,
carrying out a first operation refreshing treatment of discarding the coating material-containing powder stored in the relay tank in the first storing step as powder at its usage limit, supplying fresh said powder to the first supply tank after the powder is supplied to the powder dispersal means in the first exhaust treatment step, and resetting the number of repetitions of the first operation; and
similarly, when the number of repetitions of the second operation reaches the set number,
carrying out a second operation refreshing treatment of discarding the coating material-containing powder stored in the relay tank in the second storing step as powder at its usage limit, supplying fresh said powder to the second supply tank after the powder is supplied to the powder dispersal means in the second exhaust treatment step, and resetting the number of repetitions of the second operation.

2. The operation method for a coating exhaust treatment system according to claim 1, wherein
the number of repetitions of the second operation is set to reach the set number in the second operation carried out after the first operation in which the number of repetitions has reached the set number,
or, the number of repetitions of the first operation is set to reach the set number in the first operation carried out after the second operation in which the number of repetitions has reached the set number.

3. The operation method for a coating exhaust treatment system according to claim 1, wherein
the number of repetitions of the second operation is set to reach the set number in the second operation carried out after the first operation in which the number of repetitions has reached approximately half of the set number,
or, the number of repetitions of the first operation is set to reach the set number in the first operation carried out after the second operation in which the number of repetitions has reached approximately half of the set number.

4. An operation method for a coating exhaust treatment system including
a filter configured to filter discharged air discharged from a coating chamber in which a coating object is spray-coated and collect overspray coating material included in the discharged air, and
a powder dispersal means configured to disperse powder for forming a filter covering layer in the discharged air and form a filter covering layer made of a layer of the accumulated powder on a surface on the filter as the discharged air passes through the filter,
the method comprising:
an exhaust treatment step of dispersing the powder stored in a supply tank in the discharged air using the powder dispersal means and causing the discharged air to pass through the filter;
a storing step of storing the coating material-containing powder that was removed from the filter through filter cleaning treatment in the exhaust treatment step in a relay tank;
a separation step of separating the coating material-containing powder in the relay tank into powder to be discarded and powder to be recycled at a set separation ratio set in advance in a fixed manner;
a discarding step of discarding the powder to be discarded that was separated in the separation step;
a recycling step of recycling the powder to be recycled that was separated in the separation step with a recycling treatment portion; and
a powder refreshing step of returning the powder recycled in the recycling step to the supply tank and supplying an amount of fresh said powder that is the same as that of the powder discarded in the discarding step to the supply tank, the steps being carried out repeatedly.

5. An operation method for a coating exhaust treatment system including
a filter configured to filter discharged air discharged from a coating chamber in which a coating object is spray-coated and collect overspray coating material included in the discharged air, and
a powder dispersal means configured to disperse powder for forming a filter covering layer in the discharged air and form a filter covering layer made of a layer of the accumulated powder on a surface on the filter as the discharged air passes through the filter,
the method comprising:
an exhaust treatment step of dispersing the powder stored in a supply tank in the discharged air using the powder dispersal means and causing the discharged air to pass through the filter;
a storing step of storing the coating material-containing powder that was removed from the filter through filter cleaning treatment in the exhaust treatment step in a relay tank;
a sorting step of sorting the coating material-containing powder in the relay tank into unsuitable powder to be discarded and suitable powder to be recycled;
a discarding step of discarding the unsuitable powder to be discarded that was sorted in the sorting step;
a recycling step of recycling the suitable powder to be recycled that was sorted in the sorting step with a recycling treatment portion; and
a powder refreshing step of returning the powder recycled in the recycling step to the supply tank and supplying an amount of fresh said powder that is the same as that of the powder discarded in the discarding step to the supply tank, the steps being carried out repeatedly.

6. An operation method for a coating exhaust treatment system including
a filter configured to filter discharged air discharged from a coating chamber in which a coating object is spray-coated and collect overspray coating material included in the discharged air, and
a powder dispersal means configured to disperse powder for forming a filter covering layer in the discharged air and form a filter covering layer made of a layer of the accumulated powder on a surface on the filter as the discharged air passes through the filter,
the method comprising:
an exhaust treatment step of dispersing the powder stored in a supply tank in the discharged air using the powder dispersal means and causing the discharged air to pass through the filter;
a separation/containing step of separating and containing the coating material-containing powder that was removed from the filter through filter cleaning treatment in the exhaust treatment step in mutually different containers for each location at which the discharged air is generated;
a discarding step of discarding the coating material-containing powder that is contained in a specific container among a plurality of said containers as powder to be discarded;
a recycling step of recycling the powder contained in another container among the containers as powder to be recycled with a recycling treatment portion; and
a powder refreshing step of returning the powder recycled in the recycling step to the supply tank and supplying an amount of fresh said powder that is the same as that of the powder discarded in the discarding step to the supply tank, the steps being carried out repeatedly.

7. The operation method for a coating exhaust treatment system according to claim 1, wherein
in the recycling treatment portion, as the recycling treatment, heating treatment for causing a crosslinking reaction and hardening a coating material portion in the coating material-containing powder by heating the coating material-containing powder, and
pulverization treatment for reducing a particle diameter of the coating material-containing powder by pulverizing the coating material-containing powder are carried out.

8. The operation method for a coating exhaust treatment system according to claim 7, wherein in the recycling treatment portion, as the recycling treatment, the heating treatment is carried out by a heater that uses a chamber wall of a recycling chamber as a heat transfer wall as the pulverization treatment is carried out by rotating a rotary blade on the coating material-containing powder that is stored in the recycling chamber.

9. The operation method for a coating exhaust treatment system according to claim 7, wherein in the recycling treatment portion, as the recycling treatment, the heating treatment is carried out by supplying hot air to a recycling chamber as the pulverization treatment is carried out through collision with a rotary striker and a fixed collider on the coating material-containing powder that is stored in the recycling chamber.

10. The operation method for a coating exhaust treatment system according to claim 7, wherein in the recycling treatment portion, the powder resulting from the pulverization treatment and the heating treatment, or the coating material-containing powder that has not been subjected to the pulverization treatment and the heating treatment is subjected to a fine pulverization treatment by an airflow fine powder production machine that rotates two bladed wheels arranged near each other with matching rotational axes at a high speed in a treatment chamber.

* * * * *